US012428207B1

(12) United States Patent
Wald

(10) Patent No.: US 12,428,207 B1
(45) Date of Patent: Sep. 30, 2025

(54) BEVERAGE CONTAINER WITH MEDIA DEVICE EXTENSION

(71) Applicant: Boiled Ocean LLC, Miami, FL (US)

(72) Inventor: Jonathan Wald, Miami, FL (US)

(73) Assignee: Boiled Ocean LLC, Miami, FL (US)

( * ) Notice: Subject to any disclaimer, the term of this patent is extended or adjusted under 35 U.S.C. 154(b) by 0 days.

(21) Appl. No.: 19/174,218

(22) Filed: Apr. 9, 2025

(51) Int. Cl.
B65D 51/24 (2006.01)
B65D 1/02 (2006.01)
G03B 17/56 (2021.01)

(52) U.S. Cl.
CPC .......... B65D 51/24 (2013.01); B65D 1/0223 (2013.01); G03B 17/563 (2013.01)

(58) Field of Classification Search
CPC ....... A45F 3/16; A47G 19/22; A47G 19/2227; A47G 19/2261; B65D 1/0223; B65D 25/20; B65D 51/24; G03B 17/563
USPC ...... 215/390; 220/230, 475, 737, 8; 396/428
See application file for complete search history.

(56) References Cited

U.S. PATENT DOCUMENTS 5,706,975 A * 1/1998 Cronk ..................... A24F 15/18
220/741
8,074,841 B1 * 12/2011 Craig ................... B65D 21/086
222/464.5
10,830,390 B1 * 11/2020 Miller ..................... A45D 24/10
2008/0128378 A1 * 6/2008 Nowzari ................... B65D 1/04
215/6
2022/0080900 A1 * 3/2022 Nguyen ............. A47G 19/2205
2023/0403352 A1 * 12/2023 Alves ................... B65D 1/0207
2024/0375836 A1 * 11/2024 Raymus .................... A45F 3/18

FOREIGN PATENT DOCUMENTS

CN 113227636 A * 8/2021 ........... G03B 17/563

* cited by examiner

*Primary Examiner* — Nathan J Jenness
*Assistant Examiner* — Madison L Poos
(74) *Attorney, Agent, or Firm* — Cognition IP, P.C.; Edward Steakley; Justin White

(57) ABSTRACT

A beverage container includes a container body, a lid, an extension component, and a media device coupling component. The container body includes a bottom, sidewall(s), upper opening, and an internal volume to store a beverage therein. The lid is removably coupled to the container body proximate the upper opening to keep the beverage within the internal volume. The extension component is coupled to the container body or lid and moves between extended and retracted positions. The extension component includes a proximal end that remains stationary relative to the container body and a distal end opposite the proximal end that moves relative to the container body between the extended and retracted positions. The media device coupling component is coupled to the distal end of the extension component and is configured to facilitate a removable coupling with a separate portable media device of a user.

20 Claims, 21 Drawing Sheets

BEVERAGE CONTAINER WITH MEDIA DEVICE EXTENSION

TECHNICAL FIELD

The present disclosure relates generally to fluid containers, and more particularly to portable beverage containers and related accessories.

BACKGROUND

Smartphones, tablets, and other personal media devices are now ubiquitous in daily life, as virtually every adult in modern society typically carries their own smartphone or other personal media device everywhere that they go. This leads to many situations where a user desires to capture pictures or videos of themself, often while holding a smartphone at arm's length. While taking pictures or videos of oneself or even of others can sometimes be awkward, such as due to inadequate distances or difficult angles, there are techniques and other devices that can assist with this process. Self-held extension sticks or tripods, for example, are well known ways to capture better pictures or videos of oneself by providing better distances and angles.

Portable beverage containers are also ubiquitous in modern life, as many people carry their own water bottles, coffee tumblers, flasks, and other containers to hold their drinks as they are on the go. For example, many gym users take along their own personal water bottles for their convenience as they exercise. Some gym users prefer to video themselves or others during their workouts, such as to review their form, create social media content, or otherwise capture video. Handheld devices such as extension sticks, standalone devices such as tripods, and other self-image capture assisting devices are sometimes used in these efforts.

Unfortunately, taking a video of yourself while working out can be cumbersome or difficult with traditional self-image capture assisting devices. Self-held extension sticks require a hand to use such that taking pictures or video while working out with that hand simultaneously is difficult or not possible. Tripods and other similar devices can be more useful for filming your own or another's workout with a smartphone but carrying these extra devices around can be inconvenient. In the event that an accessory is not used and a user simply props their smartphone or device up against a bench or other equipment, viewing distances and angles will be severely limited, and the device will be prone to falling over or providing less than optimal picture and video results.

Although traditional ways of using personal media devices to take pictures and videos of a user have worked well in the past, improvements are always helpful. In particular, what is desired are systems and devices that allow users to take their own pictures and videos with their own personal media devices with a greater variety of angles and distances and without the need for excess equipment or accessories.

SUMMARY

It is an advantage of the present disclosure to provide devices and systems that allow users to take their own pictures and videos with their own personal media devices in a more reliable and consistent manner and without the need for excess equipment or accessories. The disclosed features, apparatuses, systems, and methods relate to assisting users with using their own smartphones or other personal media devices to take their own pictures and videos by using a beverage container having a media device accessory. In particular, the disclosed embodiments can include a beverage container, such as a water bottle, that includes a media device accessory, such as an extendable media device holder. In some arrangements, this can be a telescoping, extendable, and retractable extension component that is built into or coupled to a water bottle.

In various embodiments of the present disclosure, a beverage container can include at least a container body, a lid, an extension component, and a media device coupling component. The container body can include a bottom, one or more sidewalls, and an upper opening. The container body can also define an internal volume configured to store a beverage therein. The lid can be removably coupled to the container body proximate the upper opening, and the lid can be configured to hold the beverage within the internal volume while the lid is coupled to the container body. The extension component can be coupled to the container body or the lid and can be configured to move between extended and retracted positions. The extension component can include a proximal end configured to remain stationary relative to the container body and a distal end opposite the proximal end and configured to be moved relative to the container body between the extended and retracted positions. The media device coupling component can be coupled to the distal end of the extension component, and this media device coupling component can be configured to facilitate a removable coupling with a separate portable media device of a user.

In various detailed embodiments, the beverage container can be a drink bottle and the portable media device can be a smartphone. Other types of containers and media devices are also possible. In some specific arrangements, the extension component can be contained within the lid and can be configured to be coupled to and removed from the container body with the lid. The lid can include a top portion and a hollow shaft coupled to and extending downward from a bottom surface of the top portion. This hollow shaft can have an inner space that is configured to store the extension component therein. The hollow shaft can extend into the internal volume of the container body and can be configured to prevent leakage between the internal volume of the container body and the inner space of the hollow shaft. The hollow shaft can include a shaft opening at a top portion thereof with the shaft opening being located at a top surface of the lid. The shaft opening can be configured to allow the extension component to extend outward from the hollow shaft and retract back into the hollow shaft. The proximal end of the extension component can be configured to remain within the hollow shaft while the distal end extends outward from and retracts back to the shaft opening.

In various further detailed embodiments, the extension component can include a plurality of telescoping segments configured to serially extend to reach the extended position and to nest within each other to reach the retracted position. The media device coupling component can be coupled to the distal end in a manner that provides one or more rotational degrees of freedom between the media device coupling component and the extension component to facilitate positioning and orienting the separate portable media device. The beverage container can also include one or more motors configured to rotate automatically the media device coupling component about the one or more rotational degrees of freedom. In some arrangements, the media device coupling component can include a flat plate and a magnetic arrangement configured to magnetically hold the separate portable media device against the flat plate. In addition to the foregoing items, the beverage container can also include a weighted arrangement located proximate the bottom of the container body. This weighted arrangement can be configured to improve stability of the beverage container while the separate portable media device is coupled to the media device coupling component and the extension component is at its extended position. In some embodiments, the beverage container can also include an outer housing configured to hold the container body at a first location and the extension component at a second location separate from the first location. This outer housing can be configured to functionally couple the extension component to the container body and to provide increased upright stability for the beverage container.

In various further embodiments of the present disclosure, a container lid configured for use with a separate beverage container can include a top portion, an extension component, and a media device coupling component. The top portion can be configured to be removably coupled to a separate beverage container having a bottom, one or more sidewalls, an upper opening, and an internal volume configured to store a beverage therein. The top portion can be further configured to hold a beverage within the internal volume while the top portion is coupled thereto. The extension component can be coupled to the top portion and can be configured to move between extended and retracted positions. This extension component can include a proximal end configured to remain stationary relative to the top portion and a distal end opposite the proximal end and configured to be moved relative to the top portion between the extended and retracted positions. The media device coupling component can be coupled to the distal end of the extension component and can be configured to facilitate a removable coupling with a separate portable media device of a user.

In various detailed embodiments, the container lid can also include a hollow shaft coupled to and extending downward from a bottom surface of the top portion, and this hollow shaft can have an inner space that is configured to store the extension component therein. The hollow shaft can be configured to extend into the internal volume of the separate beverage container and can also be configured to prevent leakage between the internal volume of the separate beverage container and the inner space of the hollow shaft. The hollow shaft can also include a shaft opening at a top portion thereof with the shaft opening being located at a top surface of the top portion of the lid. The shaft opening can be configured to allow the extension component to extend outward from the hollow shaft and retract back into the hollow shaft. The proximal end of the extension component can be configured to remain within the hollow shaft while the distal end extends outward from and retracts back to the shaft opening. The extension component can include a plurality of telescoping segments configured to serially extend to reach the extended position and to nest within each other to reach the retracted position. The media device coupling component can be coupled to the distal end in a manner that provides one or more rotational degrees of freedom between the media device coupling component and the extension component to facilitate positioning and orienting the separate portable media device. In some arrangements, the media device coupling component can include a flat plate and a magnetic arrangement configured to magnetically hold the separate portable media device against the flat plate.

In still further embodiments of the present disclosure, various methods of capturing media content using a beverage container are provided. Pertinent process steps can include adjusting an extension component, coupling a media device to a media device coupling component, and capturing media content with the media device. The extension component can be adjusted at the beverage container from a retracted position to an extended position in a manner such that the extension component includes a proximal end that remains stationary relative to the beverage container and a distal end that moves away from the beverage container from the retracted position to the extended position. The media device coupling component can be located at the distal end of the extension component. Coupling the media device to the media device coupling component can result in the beverage container, extension component, and media device coupling component collectively holding the media device stably in place at a set position. The media device can capture media content while the media device remains coupled to the media device coupling component. Additional process steps can include placing the beverage container upright atop a stable surface, removing the media device from the media device coupling component after capturing the media content and retracting the extension component from the extended position to the retracted position after removing the media device. In some arrangements, the extended position can result in the media device coupling component being located at least two feet away from the beverage container and the retracted position can result in the media device coupling component being located substantially at the beverage container.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The drawings included are for illustrative purposes and serve only to provide examples of possible structures, arrangements, devices, systems, and methods of use for beverage containers with media device extensions and related components. These drawings in no way limit any changes in form and detail that may be made to the disclosure by one skilled in the art without departing from the spirit and scope of the disclosure.

DETAILED DESCRIPTION

Figure 1A:
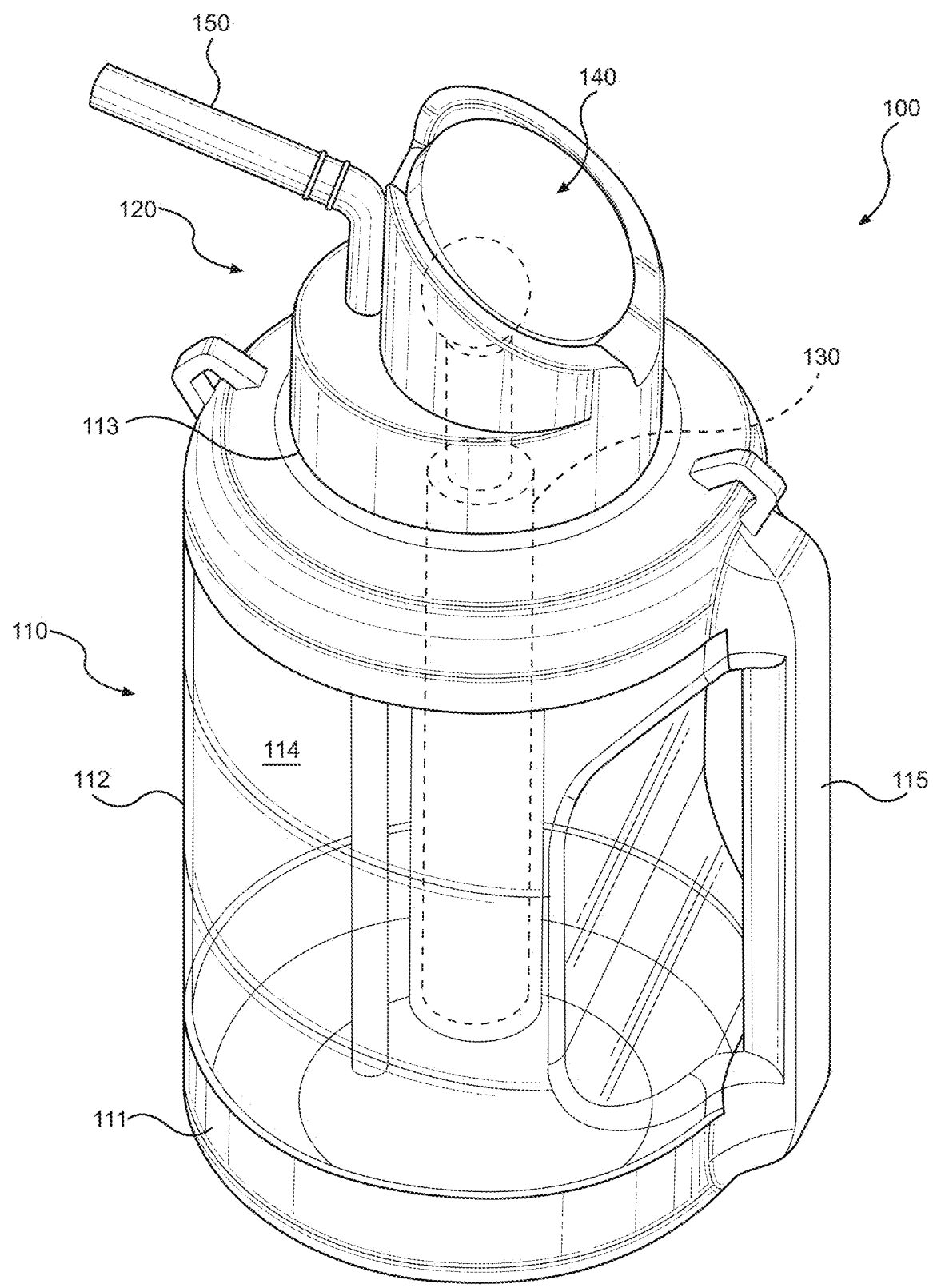
FIG. 1A illustrates in side perspective view an example beverage container with an extension component in its lid according to one embodiment of the present disclosure.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods of use for a beverage container with a media device extension. This can involve devices and systems that allow users to take their own pictures and videos with their own personal media devices in a more reliable and consistent manner without the need for excess equipment or accessories. In particular, the disclosed embodiments can include a beverage container, such as a drink bottle or water bottle, that can include a media device accessory, such as an extendable media device holder or other coupling component. In some specific arrangements, the disclosed apparatuses, systems, and methods can include a telescoping, extendable, and retractable selfie stick or similar device that is built into or coupled to a drink bottle or water bottle.

In some example applications and environments, the disclosed beverage containers with media device extensions can be used to capture video content of a user at a gym or other location without the need for the user to involve other people or carry a tripod or any other separate equipment or accessories. Because many gym users and outdoor enthusiasts carry their own water bottles to such locations anyway, use of any the disclosed embodiments can provide for greater stability of their separate media devices. In fact, the disclosed devices and systems can actually be more stable, secure, and flexible than many modes of tripods that are commercially available for these specific purposes.

Although various embodiments disclosed herein specifically discuss water bottles, telescoping selfie sticks, and smartphones as illustrative examples for purposes of illustration, it will be readily appreciated that the disclosed features, apparatuses, systems, and methods can similarly be used with any suitable substitute or alternative components, features, or materials that take advantage of the disclosed examples and possible alternatives. For example, the disclosed devices, systems, and methods can involve the use of other suitable containers beside fluid or beverage containers. Similarly, media device extensions can involve the use of items beyond telescoping selfie sticks, such as adjustable arms or features that can pivot, rotate, stretch, or otherwise move a media device holder or other coupling component away from the container in a stable manner. In addition to smartphones, separate media devices that can be supported by the disclosed devices and systems can include tablets, media players and recorders, digital cameras, analog cameras and other suitable portable media devices. Other applications, arrangements, and extrapolations beyond the illustrated embodiments are also contemplated.

Referring first to FIG. 1A, an example beverage container with an extension component in its lid is illustrated in side perspective view. Beverage container 100 can include components such as container body 110, lid 120, extension component 130, and media device coupling component 140. Other components can include, for example, a removable straw 150 that can be placed through an opening in lid 120 to access beverage within container body 110, among other possible beverage container components. In various embodiments, beverage container 100 can be a portable drink bottle or water bottle that is configured to be usable with a portable media device, such as a smartphone. Again, these can also be other items, such as any other suitable container and any other suitable media device, such that the drawings and written details provided herein are merely illustrative examples and are not intended to be limiting.

Each of the foregoing components of beverage container 100 can have various features and functionalities, at least some of which may be optional or variable in some cases. For example, container body 110 can have a bottom 111, one or more sidewalls 112, an upper opening 113, an inner volume 114, and a handle 115, among other possible features. Container body 110 can define inner volume 114 such that the inner volume is configured to store a beverage or other liquid therein. Upper opening 113 can be configured to interact with lid 120 such that the lid can be removably coupled to container body. A beverage or other liquid can be easily poured or placed into inner volume 114 when lid 120 is removed, and the lid can be configured to hold the beverage or other liquid within the internal volume while the lid is coupled to the container body. Coupling can involve threaded arrangements on both container body 110 and lid 120, for example, among other removable coupling features or items.

Extension component 130 can be coupled to container body 110, lid 120, or both in various arrangements. Extension component 130 can be contained within lid components and features as shown in FIG. 1A, for example, such that the extension component can remain with lid 120 when the lid is removed from container body 110. Extension component 130 can be configured to move between extended and retracted positions and can be fully or substantially contained within lid 120 when it is in its fully retracted position, as noted by broken lines for its hidden location when retracted as shown in FIG. 1A. As shown and described in greater detail below, extension component 130 can include a proximal end configured to remain stationary relative to container body 110 and a distal end opposite the proximal end and configured to be moved relative to the container body between the extended and retracted positions.

Media device coupling component 140 can be coupled to the distal end of extension component 130 such that it extends away from container body 110 when the distal end extends away from the container body, and this media device coupling component can be configured to facilitate a removable coupling with a separate portable media device of a user, as also shown and described in greater detail below. In various arrangements, media device coupling component 140 can be angled as shown to allow for ease of use and access to other components or features of beverage container 100, such as, for example, handle 115, straw 150, one or more hooks or grips on container body 110 and/or lid 120. Straw 150 can be sized and shaped with a suitable geometry to be placed through a straw opening in lid 120 such that a user is able to readily drink a beverage from inner volume 114 of container body 110 without needing to remove lid 120, adjust media device coupling component 140, or remove or adjust any other components or features of beverage container 100, as will be readily appreciated.

The various components and features of beverage container 100, such as container body 110, lid 120, extension component 130, media device coupling component 140, straw 150, and others, can be formed from any suitably sturdy material to support their intended functions while also providing safe and cleanable surfaces for consuming a beverage within the beverage container. Such materials can include, for example, stainless steel, aluminum, carbon fiber, hardened thermoplastics, and any other suitable consumer friendly metal, plastic, or other material, as will be understood by those of skill in the art. In various embodiments, some or all of the components and items of beverage container 100 can be readily disassembled from each other and further disassembled as separate units, such as to facilitate dishwasher use or other cleaning, replacement of worn or defective parts, or other consumer desirable functions.

Figure 1B:
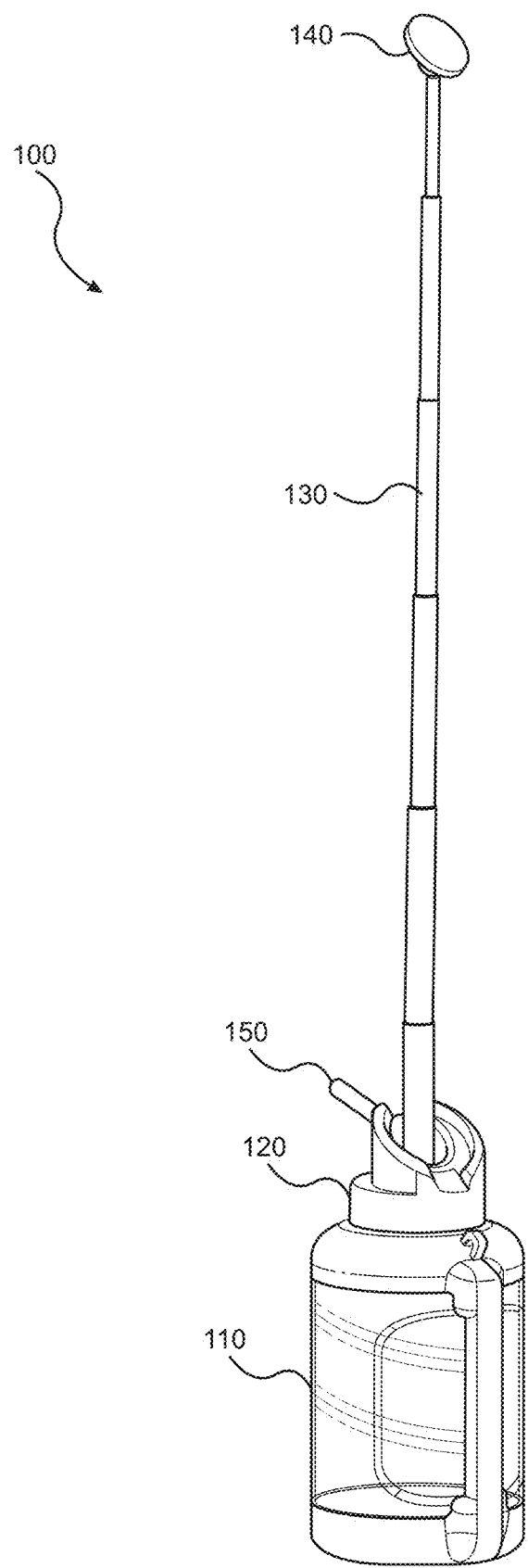
FIG. 1B illustrates in side perspective view the beverage container of FIG. 1A with its extension component fully extended according to one embodiment of the present disclosure.

Moving next to FIG. 1B, the beverage container of FIG. 1A is similarly illustrated in side perspective view with its extension component being fully extended. As shown in FIG. 1B, beverage container 100 can be identical or substantially similar to the beverage container shown above. Rather than its extension component 130 being fully retracted, however, the extension component is shown as being fully extended. While container body 110, lid 120, and straw 150 can all remain exactly or substantially the same as in FIG. 1A above, extension component 130 can fully extend from its retracted position such that media device coupling component 140 is moved thereby. This can involve a proximal end of extension component 130 remaining at container body 110, lid 120, or both, while a distal end of the extension component moves away from the container body and lid. Since media device coupling component 140 is coupled to the distal end, this results in the media device coupling component moving from its initial retracted position proximate the lid to its fully extended position as shown.

In some arrangements, fully extending extension component 130 can result in media device coupling component 140 being moved to a vertical distance that is four times the height of beverage container 100 when the extension component is fully retracted. Of course, other heights or vertical distances are also possible, such as two times, three times, or five times the height of the beverage container or more. Such fully extended movement can correspond to absolute distances such as two, three, four, or five feet or more, and will correspond to the particular dimensions and geometries of a given beverage container, extension component, and other device components and features. In some embodiments, extension component 130 can be configured to be extendable to various distances that are not fully extended, such as extension distances that are $\frac{1}{6}$, $\frac{1}{5}$, $\frac{1}{4}$, $\frac{1}{3}$, $\frac{2}{5}$, $\frac{1}{2}$, $\frac{3}{5}$, $\frac{3}{4}$, and $\frac{5}{6}$ of fully extended, among other partially extended distances.

It will be readily appreciated that when extension component 130 is extended to any significant distance or height up to and including a fully extended configuration, that this can result in beverage container 100 still providing overall system stability when a separate media device of a user is coupled to media device coupling component 140. In other words, beverage container 100 with an adjusted extension component 130 and raised media device coupling component 140 can effectively serve as a stable tripod for a separate media device, such as a smartphone, tablet, camera, or other suitable media device, for example. In some arrangements, the weight of container body 110 and lid 120 provides sufficient ballast to counteract any undue moment that might be created in the overall system by a separate media device being coupled to a fully raised media device coupling component 140 such that the system will not fall or tip over. System stability can also be enhanced due to the geometry of container body 110 is some cases. For example, container body 110 can have a relatively large or wide base as shown, such that greater overall stability results to prevent the container body from falling or tipping over.

Although not usually necessary, added system stability to prevent or limit falling or tipping can be observed by way of one or more techniques or features. For example, added system stability can be achieved by having some or more beverage within the inner volume of container body 110, such that the weight of the liquid provides added ballast that limits the ability of the system to tip over when a media device is coupled to the media device coupling component. Of course, keeping a sufficient amount of beverage in the beverage container for greater media device heights can be managed by a user based on specific use circumstances.

In some arrangements, a separate weighted component (not shown) can be included within or proximate container body 110 to provide even more ballast or stability, such as where a given extension component 130 is configured for significant or extreme extension distances. Such a weighted component can be located at or proximate the bottom of container body 110, for example, and can be a high density metal or other material that can be inside or outside of the inner volume for holding a beverage. In a specific example, a steel plate matching the geometry of the container body can be coupled to the bottom of the container. In addition, or alternatively, one or more fins (not shown) can extend outward from the bottom of the container, which can be particularly beneficial for instances where container body 110 has a relatively narrower width. Such stability fins can permanently extend outward from the container base or can be configured to be retractable around the base, such as where it might be desirable to put the container body into a standard sized cup holder, for example.

Figure 2A:
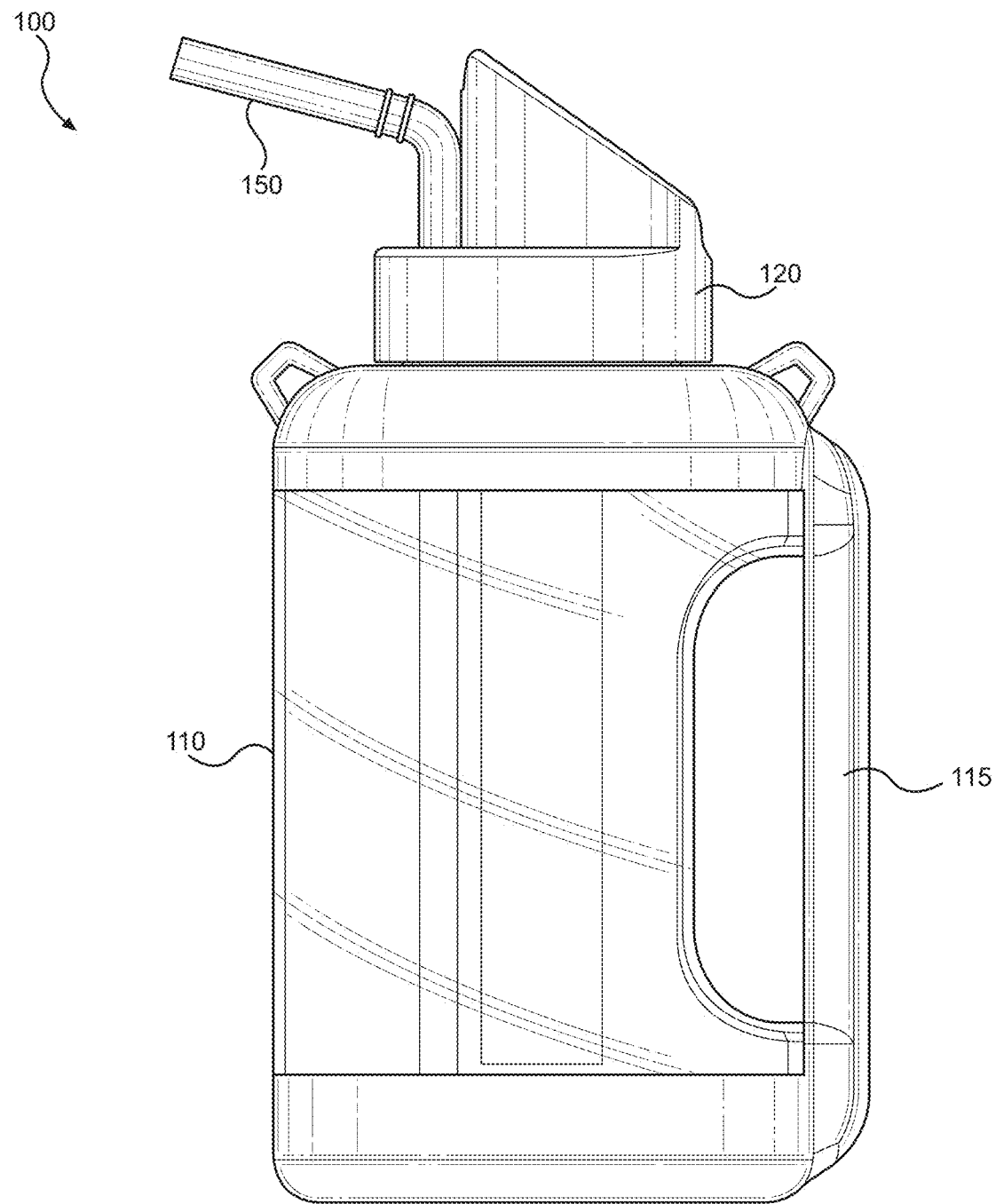
FIG. 2A illustrates in side elevation view the beverage container of FIG. 1A according to one embodiment of the present disclosure.
Figure 2B:
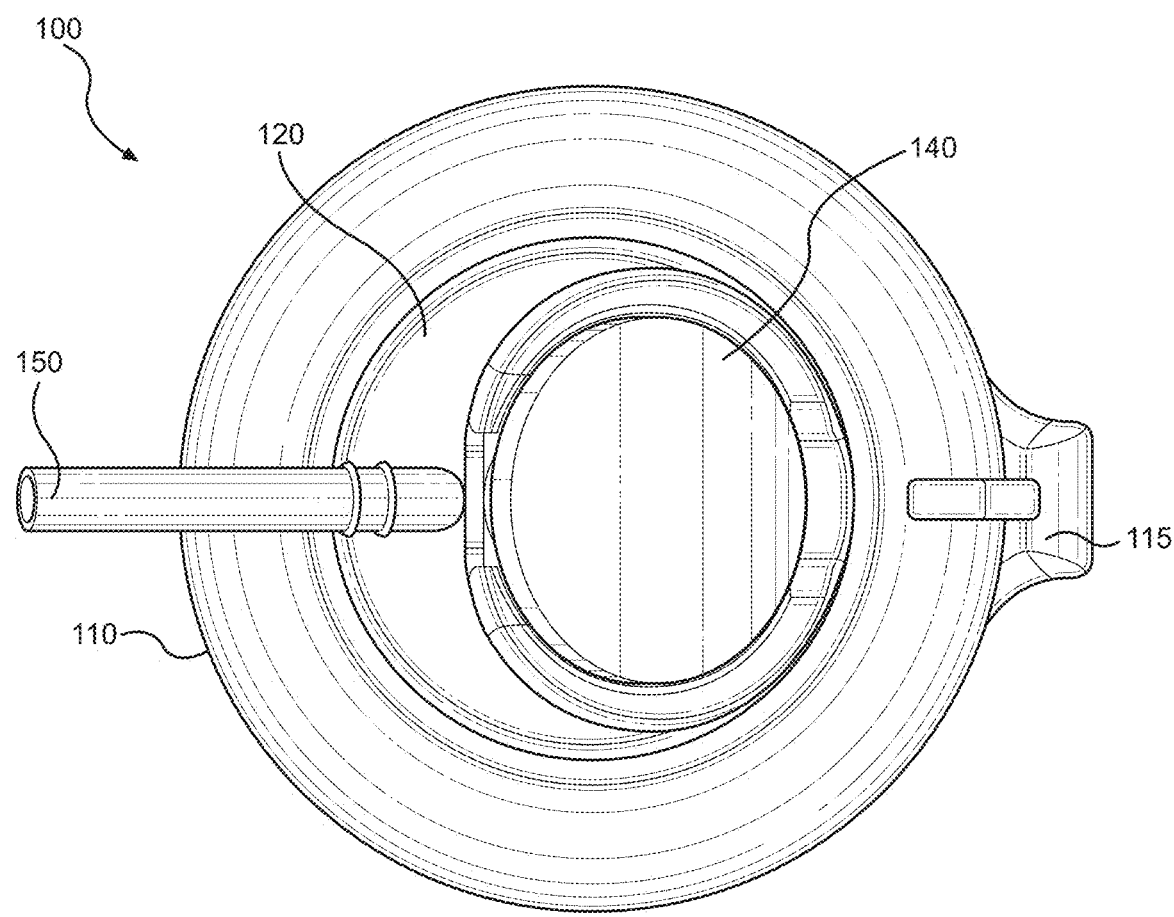
FIG. 2B illustrates in top plan view the beverage container of FIG. 1A according to one embodiment of the present disclosure.
Figure 2C:
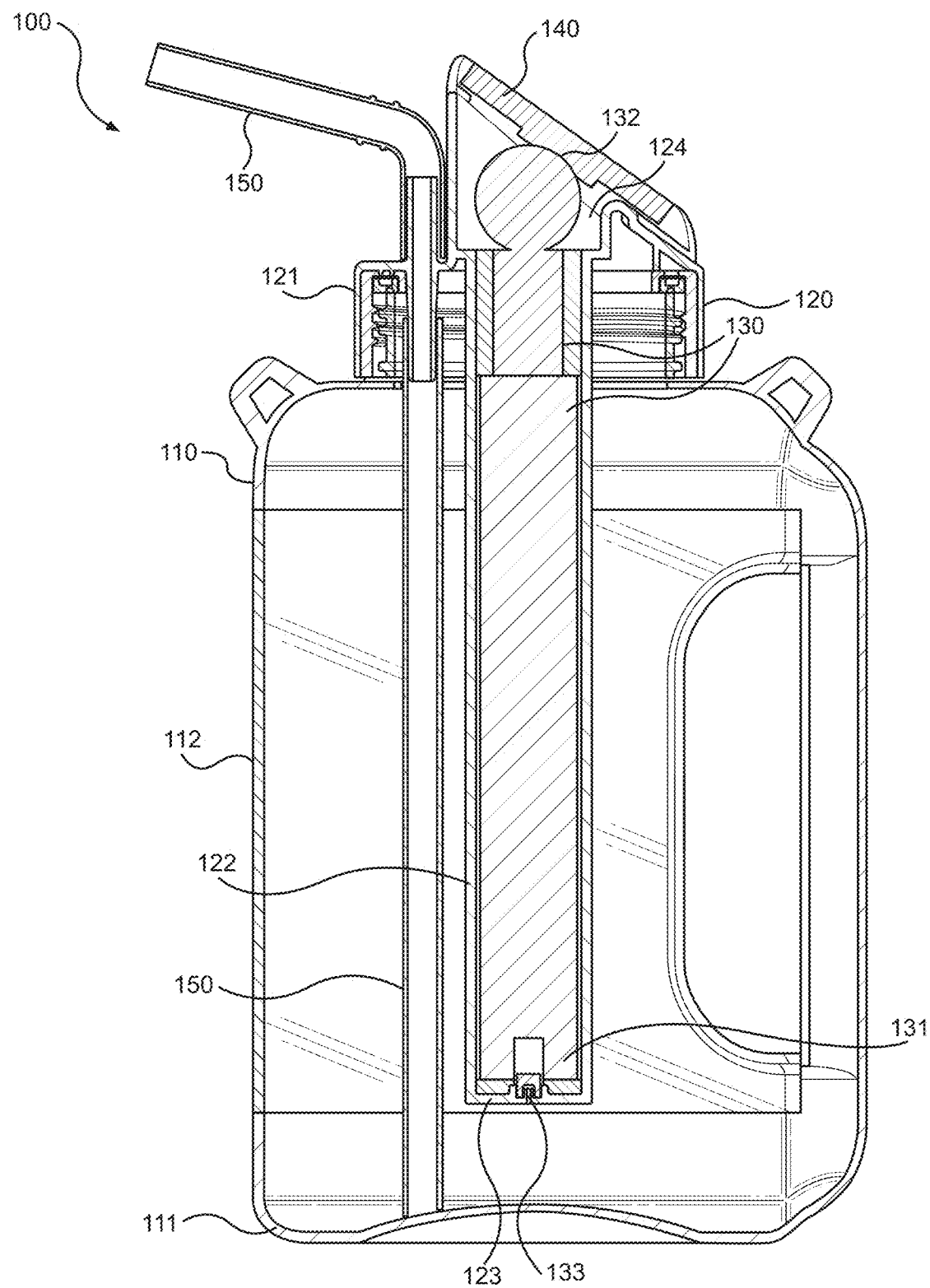
FIG. 2C illustrates in side cross-section view the beverage container of FIG. 1A according to one embodiment of the present disclosure.

FIGS. 2A-2C illustrate the beverage container of FIG. 1A in side elevation, top plan, and side cross-section views respectively. Again, beverage container 100 can be identical or substantially similar to the beverage container shown and described above, and as such can include a container body 110, lid 120, extension component 130, media device coupling component 140, and straw 150, among other possible components and features. As shown in FIG. 2C specifically, lid 120 can include a top portion 121 that can be configured to facilitate a removable coupling with container body 110 and a hollow shaft 122 coupled to and extending downward from a bottom surface of the top portion. Such a bottom surface can be any suitable surface facing downward at the top portion 121 of lid 120, such as that which is shown. Hollow shaft 122 can have an inner space configured to store some or all of extension component 130 therein. As shown, lid 120 can be arranged such that hollow shaft 122 extends into the internal volume of container body 110 when the lid is properly coupled to the container body.

Hollow shaft 122 can have a bottom 123 such that it effectively forms an outer housing for the extension component 130. In this manner, hollow shaft 122 can be configured to prevent leakage between the internal volume of the container body and the inner space of the hollow shaft. Hollow shaft 122 can also have a shaft opening 124 at a top portion thereof, which can also be located at a top surface of the lid 120. Shaft opening 124 can be configured to allow extension component 130 to extend outward from hollow shaft 122 and retract back into the hollow shaft to facilitate the ready adjustment of the extension component.

As noted above, extension component 130 can have a proximal end 131 that is configured to stay with container body 110 and/or lid 120 when the extension component is adjusted and a distal end 132 that is configured to move outward and away from the container body and/or lid when the extension component is adjusted. In the specific arrangement shown in FIG. 2C, proximal end 131 can be configured to remain within hollow shaft 122 while distal end 132 extends outward from and retracts back to shaft opening 124 during the extension or retraction of extension component 130. proximal end 131 can be fastened or otherwise coupled to hollow shaft 124, such as at hollow shaft bottom 123 by way of any suitable coupling component or arrangement 133.

Distal end 132 can be coupled to media device coupling component 140 such that these items move together whenever extension component 130 is extended or retracted. Such a coupling can involve the use of a rotatable gimbal, for example, such that media device coupling component 140 can be pivoted and/or rotated in multiple directions with respect to distal end 132 while remaining coupled thereto. Such an arrangement can allow for greater flexibility for the position and orientation of a separate media device coupled to media device coupling component 140, as will be readily appreciated. As shown, media device coupling component 140 can include a flat plate as well as a magnetic arrangement configured to magnetically hold a separate portable media device against the flat plate. For example, the flat circular plate shown can be sized and shaped to interact with many standard types and sizes of smartphones. Such an arrangement can have magnets on both sides of the flat plate, such that the flat plate can rotatably and pivotably couple on one side to distal end 132 and such that the flat plate can removably couple on its opposite side to the backside of a smartphone, tablet, camera, or any other suitable media device.

Of course, other suitable types and arrangements for a given media device coupling component are also possible. Rather than media device coupling component 140 being a flat circular plate as shown here for purposes of illustration and example, alternative coupling component arrangements can include clamping mechanisms, grips, mechanical frames, and any other arrangement suitable to firmly hold a media device in place as well as to readily release the media device when actuated or pulled away by a user, as will be readily appreciated.

Figure 3A:
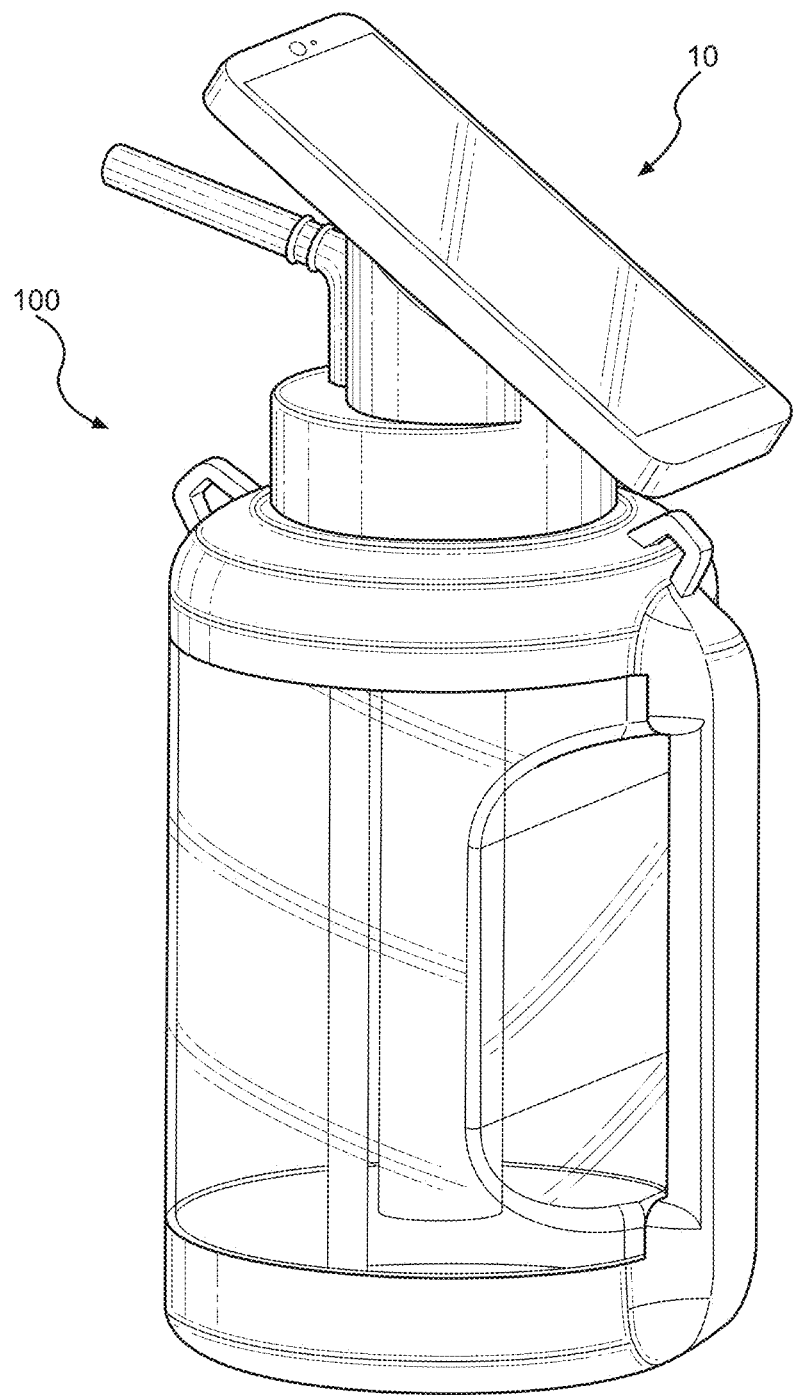
FIG. 3A illustrates in side perspective view the beverage container of FIG. 1A with a separate media device coupled thereto according to one embodiment of the present disclosure.
Figure 3B:
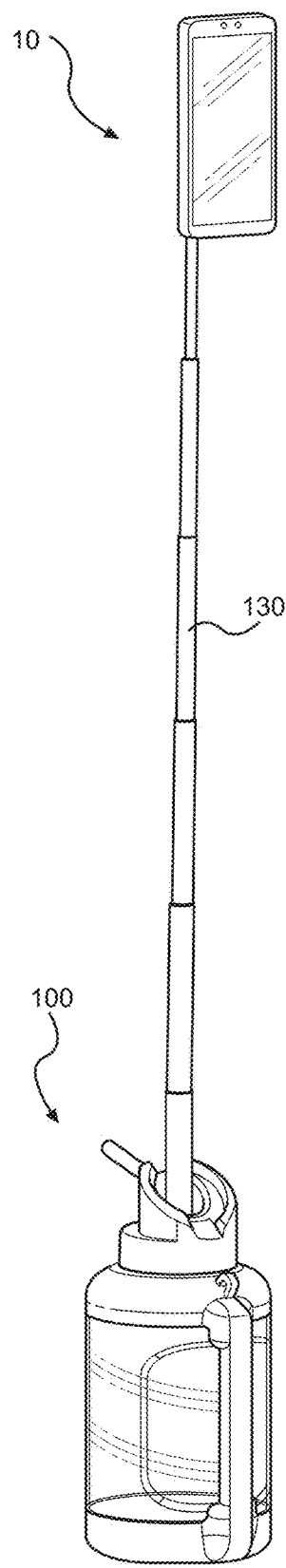
FIG. 3B illustrates in side perspective view the beverage container of FIG. 3A with its extension component fully extended and the coupled media device arranged at a first orientation according to one embodiment of the present disclosure.
Figure 3C:
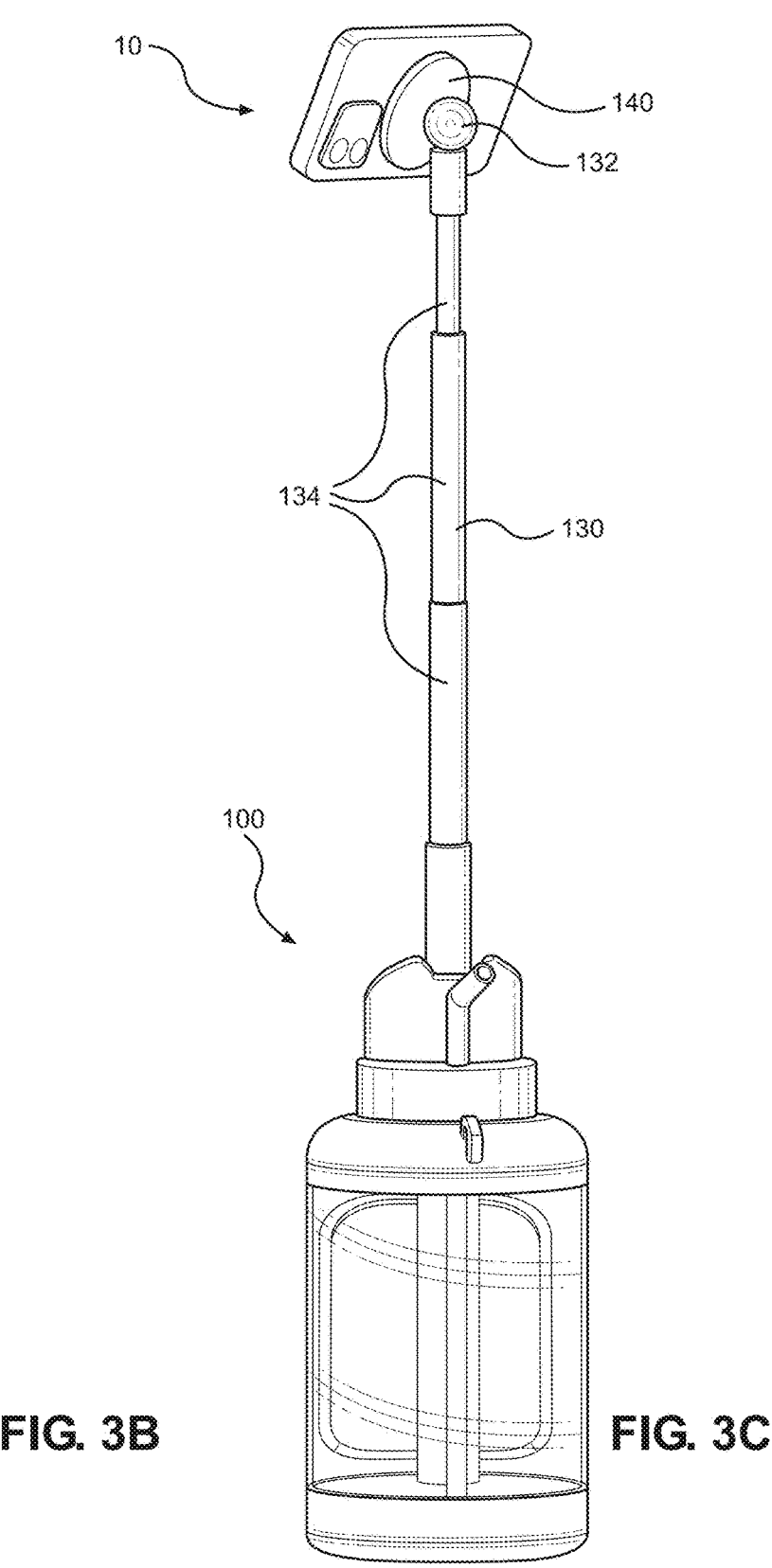
FIG. 3C illustrates in front perspective view the beverage container of FIG. 3A with its extension component partially extended and the coupled media device arranged at a second orientation according to one embodiment of the present disclosure.

Continuing with FIGS. 3A-3C, the beverage container of FIG. 1A with a separate media device coupled thereto is shown in various views. FIG. 3A depicts the beverage container in side perspective view with its extension component fully retracted, FIG. 3B depicts the beverage container in side perspective view with its extension component fully extended and the coupled media device arranged at a first orientation, and FIG. 3C depicts the beverage container in front perspective view with its extension component partially extended and the coupled media device arranged at a second orientation. As can be seen from these illustrative examples, beverage container 100 can be arranged such that a separate media device 10 coupled thereto can be supported at a fully retracted position, as seen in FIG. 3A, as well as at multiple different extension lengths and orientations, as seen in FIGS. 3B and 3C. For example, media device 10 can be supported when extension component 130 is fully extended (e.g., FIG. 3B) or when the extension component is only partially extended (e.g., FIG. 3C).

Media device 10 can also be supported at an upright orientation (e.g., FIG. 3B), at a landscape orientation (e.g., FIG. 3C), or at any other rotational position therebetween, such as by rotating media device coupling component 140 with respect to distal end 132 about an axis that is normal to the face of the media device. Media device 10 can also be oriented to face in any direction, such as by rotating media device coupling component 140 with respect to distal end 132 about an axis through extension component 130 and/or by rotating or spinning the extension component itself about its axis. In some cases, media component 10 can also be tilted at various angles to face upwards, sideways, or downwards, such as by way of additional arrangements and features in media device coupling component 140, as will be readily appreciated. Media device coupling component 140 can thus be coupled to distal end 132 in a manner that provides for one, two, or even three rotational degrees of freedom between the media device coupling component and extension component 130, to facilitate positioning and orienting a separate portable media device 10 coupled to the media device coupling component.

In some embodiments, beverage container 100 can include one or more motors and/or other automated components (not shown) that can be configured to automatically rotate or otherwise move media device coupling component 140 about one or more of the available rotational degrees of freedom to facilitate more convenient positioning and orienting of the separate portable media device 10. For example, one motor can be positioned at or near a lower portion of extension component 130 such that all or at least an upper portion of the extension component can be spun or rotated about its longitudinal axis in a robotic or automated fashion, which in turn can rotate media device coupling component 140 (and thus any separate portable media device 10 coupled thereto) to face a different direction. As another example, one or two other motors can be positioned at or near the coupling between extension component 130 and media device coupling component 140. Such other motor(s) can be configured to tilt and/or rotate media device coupling component 140 (and thus any separate portable media device 10 coupled thereto) about an axis normal thereto in an automated fashion.

Automated operation of these one, two, or three motors or other suitable automated components can be controlled in a variety of ways. In some arrangements, these items can be controlled remotely by a user, such as by way of a separate remote control device having one or more buttons or other inputs. Control might also be facilitated by way of specific voice commands or prompts, such as where the automated system has one or more microphones and processing components configured to act upon detecting such voice inputs. Alternatively, or in addition, one or more automated inputs can control functionality of such rotational motors and/or other automated items. For example, a program or app loaded onto the smartphone or other associated media device can be configured to communicate with the automated system, such as by way of a port and wired connection or by Bluetooth pairing or any other short range wireless communication arrangement. The smartphone or other media device can then provide input to the program or loaded app, such as camera visual input, for example, whereupon the program can be configured to analyze the camera visual input or other input and send commands to the one or more motors to adjust the position and orientation of the media device coupling component and associated media device accordingly.

In various arrangements, beverage container 100 can be configured such that a separate media device 10 can be coupled to or removed from the media device coupling component 140 when extension component is fully retracted, fully extended, or at any position therebetween. Similarly, media device coupling component 140 can be configured such that it can be manipulated into various different supporting orientations for media device 10 before or while the media device is coupled to the media device coupling component. As such, a separate media device 10 can be coupled to beverage container 100 while extension component 130 is fully retracted, as shown in FIG. 3A, whereupon the extension component can be fully extended and the media device tilted forward to result in the combined system shown in FIG. 3B. As an alternative, beverage container 100 as shown in FIG. 1A without a media device can have its extension component and media device coupling component adjusted before coupling a separate media device thereto. Still further, extension component 130 and/or media device coupling component 140 can be adjusted from one extended length and/or orientation to another while a separate media device 10 remains attached during the process.

In various specific embodiments, extension component 130 can be a telescoping stick having a plurality of telescoping segments configured to serially extend to reach the extended position and to nest within each other to reach the retracted position. For example, extension component 130 can include six telescoping segments 134 that can nest within each other to hide the extension component 130 as shown in FIG. 3A, or that can be extended to a variety of different lengths, such as fully extended as shown in FIG. 3B or partially extended as shown in FIG. 3C. Of course, fewer or more telescoping segments can be used in a given extension component design. One or more telescoping segments 134 may also have locking pin and opening arrangements that can be configured to lock segments in place at certain lengths relative to each other when fully extended or at various partial extension distances. Such an arrangement can include a button release to unlock any locked segments to facilitate segment retraction and nesting, similar to arrangements that can be found in consumer portable luggage handles. In addition, or alternatively, some or all of segments 134 can be configured to be held in place by way of friction based arrangements, which can include a rotational element between slightly asymmetrical segments to facilitate friction holds and releases. Again, other suitable types and forms of extension components are also possible.

Figure 4:
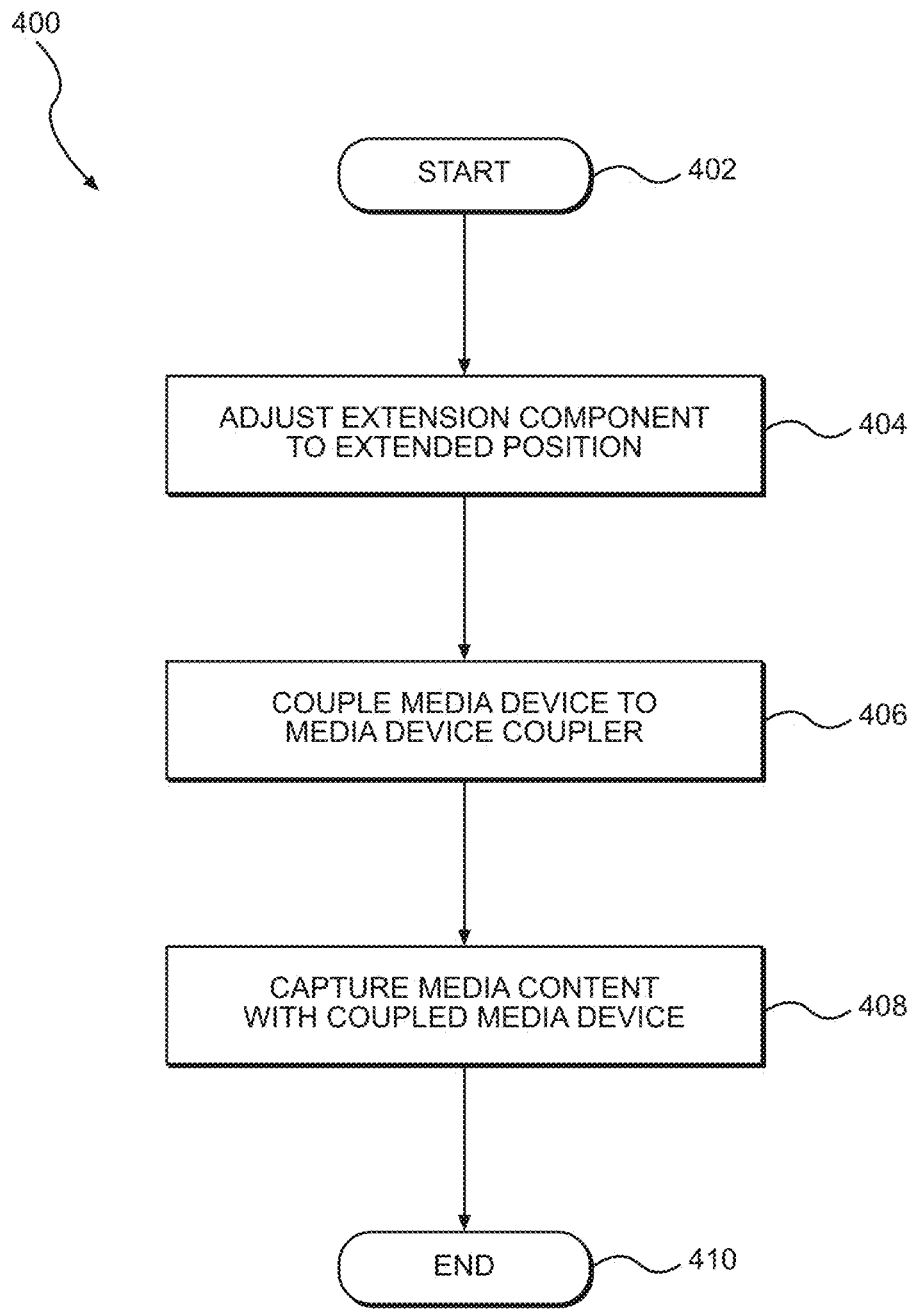
FIG. 4 illustrates a flowchart of an example summary method of capturing media content using a beverage container according to one embodiment of the present disclosure.

Next, FIG. 4 illustrates a flowchart of an example summary method of capturing media content using a beverage container. Summary method 400 can represent one broad aspect for overall methods of storing capturing media content using a beverage container, and it will be understood that various other steps, features, and details of such a broad aspect and overall methods are not provided here for purposes of simplicity. While the disclosed methods can involve the use of smartphones and water bottles, it is contemplated that the disclosed systems and methods can alternatively be applied to other types of containers and media devices.

After a start step 402, a first process step 404 can involve adjusting an extension component to an extended position. The extension component can be that which is shown and described above, such as a telescoping selfie stick or other similar or suitable device. As also shown and described above, the extension component can be coupled to a beverage container, such as at a lid or container body of the beverage container. Step 404 can be performed automatically or partially automated in some arrangements, such as where one or more motors or automated items associated with the extension component can facilitate the adjustment.

At a following process step 406, a media device can be coupled to a media device coupler or coupling component. Again, the media device can be a smartphone or any other suitable media device. The media device coupling component can be that which is shown and described above, such as a flat magnetic plate coupled to an extendable end of the extension component. Coupling the media device to the media device coupling component can result in the beverage container then supporting the media device, similar to how a tripod can also support such a media device. Step 406 can be performed automatically or partially automated in some arrangements, such as where one or more motors or automated items associated media device coupling component can facilitate the coupling.

At the next process step 408, media content can be captured with the coupled media device. This can involve, for example, taking a video using the now coupled and supported smartphone. A user can be involved with various settings, starting, and stopping of capturing the media content, as will be readily appreciated. Step 408 can be performed automatically or partially automated in some arrangements, such as where the media device is programmed to capture media content automatically based on various settings or inputs, which can also involve the use of one or more remote controls or other associated computing or processing devices.

Summary method 400 can then end at end step 410. In some arrangements, one or more of the foregoing steps can be performed simultaneously or in a different order. For example, step 406 can be performed before step 404 in some arrangements. Not all steps are necessary in all situations, and additional steps and details can be added. Further steps, details, and variations are provided in detailed method 700 set forth below.

Transitioning to FIGS. 5A-5D an example container lid configured for use with a separate beverage container is illustrated in side perspective, bottom perspective, side cross-section, and side perspective cross-section views respectively. As shown and described above in the foregoing embodiments, a selfie stick or other suitable media extension device can be built into a removable lid for a beverage container or beverage container system, such that the lid is a significant component of the device or system. In some arrangements, the lid itself can be a self-contained device that is configured to transform a commercially available water bottle or other beverage body into the system shown above or a system that is substantially similar. In this manner, a standalone lid can be configured to be removably coupled with one or more different separately available beverage container bodies, such as those that have standardized opening sizes with standardized threaded coupling arrangements. Such a lid can contain and facilitate the use of an extension component and media device coupling component by itself such that various separate and compatible beverage container bodies can be used interchangeably with the lid.

As shown in FIGS. 5A-5D, container lid 500 can be identical or substantially similar to lid 120 as shown and described in the foregoing embodiments. Container lid 500 can be self-contained and configured for use with a separate beverage container, such as container body 110 shown and described above or any other similarly suitable separate container body or beverage container. Container lid 500 can include top portion 521, extension component 530, media device coupling component 540, and straw 550, among various other possible components and features. Container lid 500 can be configured to removably couple to a separate beverage container, such as by screwing onto and off from a threaded upper lip or opening of the separate beverage container. As noted above, the separate beverage container can have a bottom, one or more sidewalls, an upper opening, and an internal volume configured to store a beverage therein. Top portion 521 of container lid 500 can be configured to removably couple to the separate beverage container and can also be configured to hold a beverage within the internal volume of the separate beverage container while the top portion is coupled thereto.

Removable coupling with a separate beverage container can be facilitated by way of a threaded arrangement 525 located along an inner surface of top portion 521. In various arrangements, top portion 521 of container lid 500 can have a main portion 527 configured to facilitate coupling with a separate beverage container and a raised portion 528 coupled to and raised above the main portion. Main portion 527 can have a geometry that facilitates coupling to the separate beverage container and can have the internal threaded arrangement 525 to facilitate such a removable coupling. Raised portion 528 can have a geometry that provides a housing or rest location for media device coupling component 540 when extension component 530 is fully retracted. Main portion 527 and raised portion 528 can be integrally formed as a single combined unit, which can eliminate or limit spillage from inside a separate beverage container.

Extension component 530 can be coupled to top portion 521 and can be configured to move between extended and retracted positions. Such a coupling can be direct or indirect, such as where one or more intermediary components facilitate the coupling. This can include, for example, extension component being coupled to a bottom 523 of a hollow shaft 522 that in turn is coupled to and descends from top portion 521. As in the foregoing embodiments, extension component 530 can include a proximal end 531 configured to remain stationary relative to top portion 521 and a distal end 532 opposite the proximal end and configured to be moved relative to the top portion between the extended and retracted positions. As detailed above, extension component 530 can include a plurality of telescoping segments configured to serially extend to reach the extended position and to retract such that they nest within each other to reach the retracted position. Other suitable forms of extension components are also possible.

Container lid 500 can be identical or substantially similar to embodiments disclosed above in that it can include a hollow shaft 522 that can be coupled to and extend downward from top portion 521. Hollow shaft 522 can include a bottom 523 such that it forms a housing to store extension component 530 therein. Hollow shaft 522 can also have a shaft opening 524 at a top portion thereof, which can also be located at a top surface of container lid 500. This shaft opening 524 can be configured to allow extension component 530 to telescope or otherwise extend outward from hollow shaft 522 and retract back into the hollow shaft to facilitate the ready adjustment of the extension component. Proximal end 531 of extension component 530 can be coupled to hollow shaft bottom 523 by way of coupling arrangement 533.

Media device coupling component 540 can be coupled to distal 532 end of extension component 530 such that it moves with the distal end when the extension component is extended and retracted. Media device coupling component 540 can be configured to facilitate a removable coupling with a separate portable media device of a user (not shown). As in the foregoing embodiments, media device coupling component 540 can be a circular flat plate with one or more magnetic arrangements that facilitate rotational couplings with a separate media device, although other types and arrangements of coupling components are also possible.

Figure 5A:
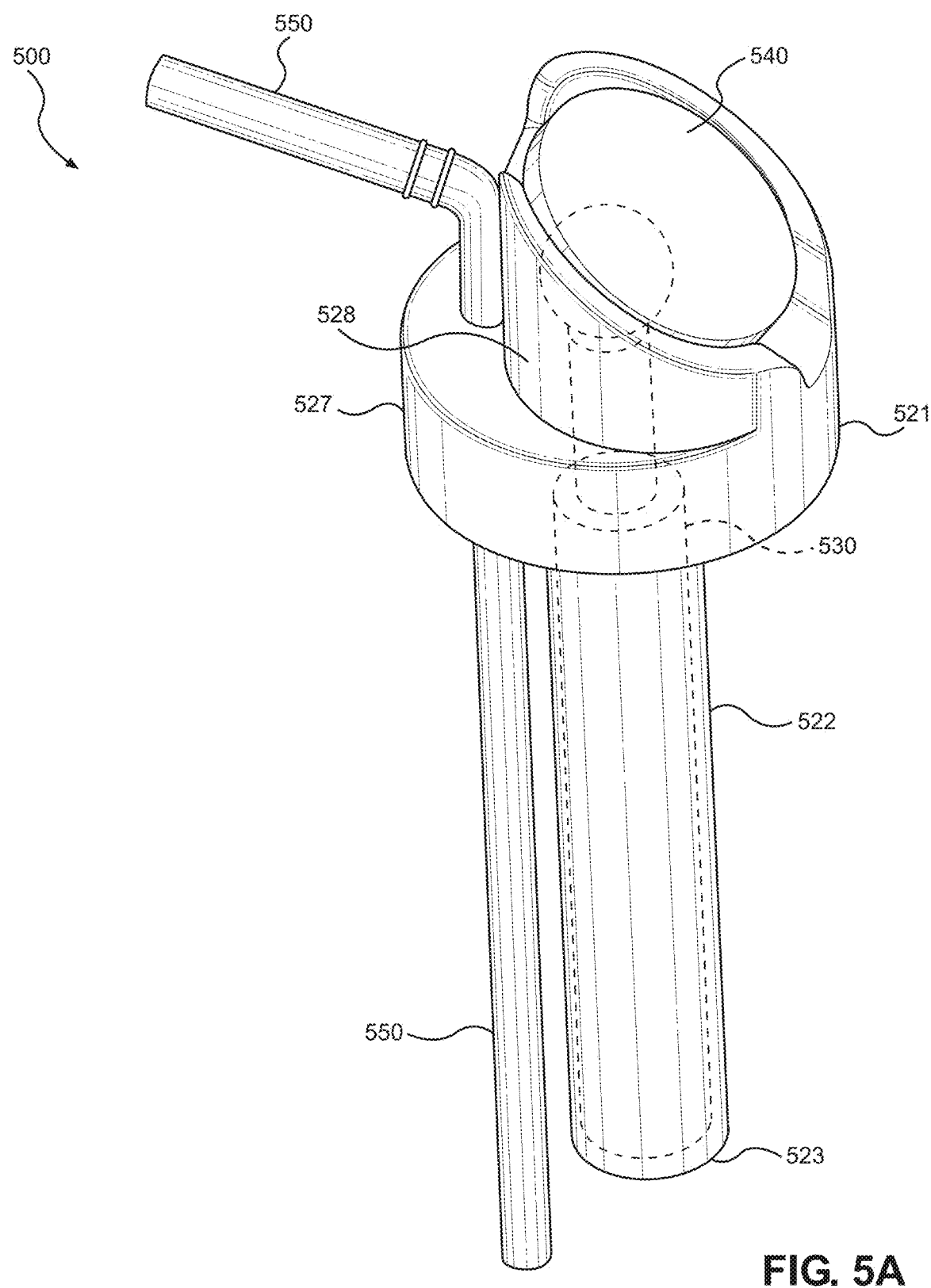
FIG. 5A illustrates in side perspective view an example container lid configured for use with a separate beverage container according to one embodiment of the present disclosure.
Figure 5B:
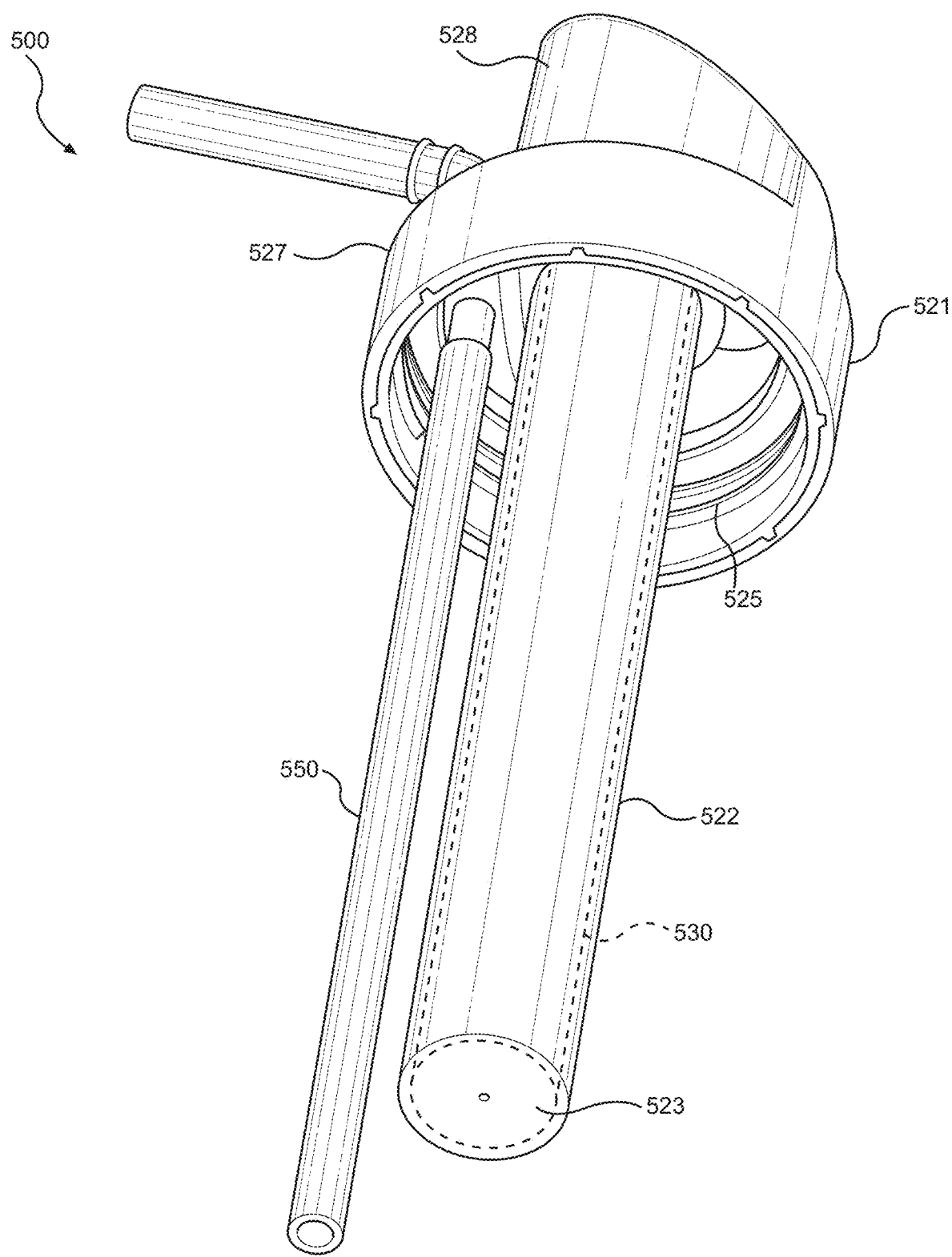
FIG. 5B illustrates in bottom perspective view the container lid of FIG. 5A according to one embodiment of the present disclosure.
Figure 5C:
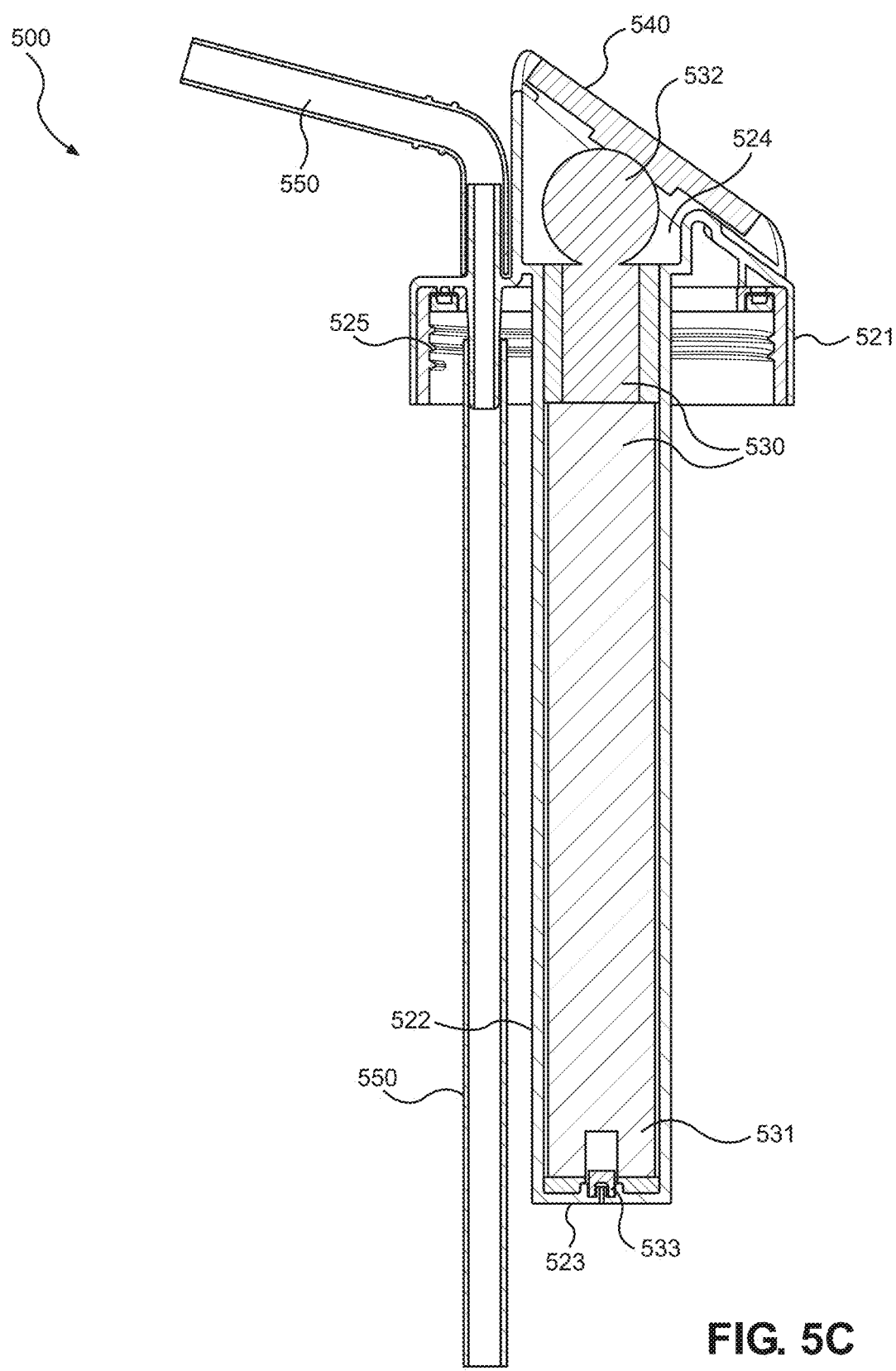
FIG. 5C illustrates in side cross-section view the container lid of FIG. 5A according to one embodiment of the present disclosure.
Figure 5D:
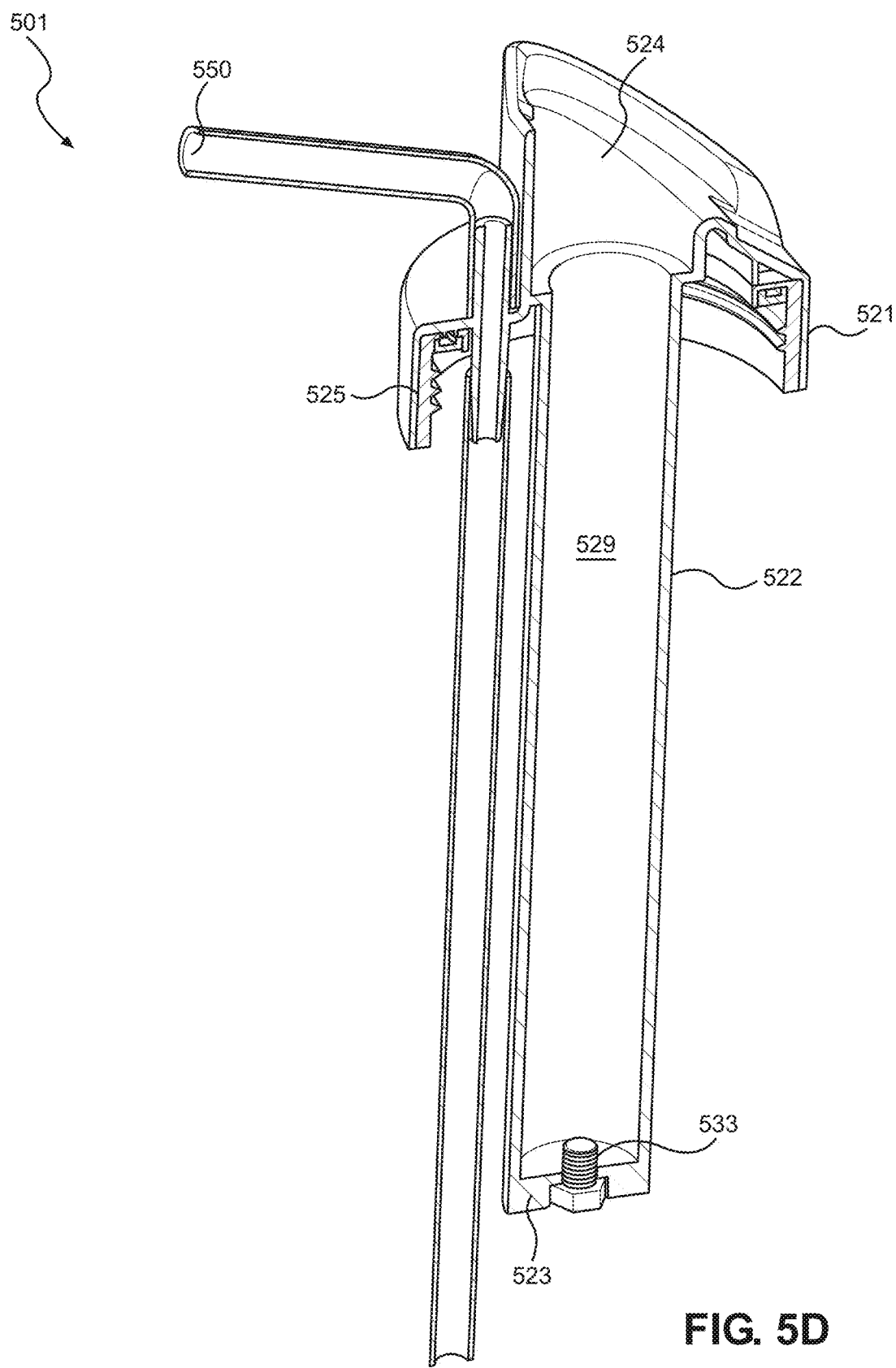
FIG. 5D illustrates in side perspective cross-section view the container lid of FIG. 5C with its extension component and media device coupling component removed according to one embodiment of the present disclosure.

FIG. 5D illustrates the container lid with its extension component and media device coupling component removed. As shown with components removed, container lid shell 501 can include top portion 521 and hollow shaft 522, which again can be integrally formed as a single unit. Hollow shaft 522 can have a bottom 523 and can define an inner space 529 configured to hold an extension component therein, with shaft opening 524 at the top of the hollow shaft being configured to allow for the extension component to extend therefrom. Straw 550 can also be included as integrated with container lid shell 501 or can alternatively be arranged as a removable component.

Again, a suitable coupling component or arrangement 533 can be located at the bottom 523 of hollow shaft 522 to facilitate coupling with one distal end of an extension component. This can be a simple screw or bolt as shown, for example. Coupling component or arrangement 533 can also be one or more screws, bolts, pins, adhesives, or any other suitable fastener or couplings. In some arrangements, coupling component 533 can be a removable coupling arrangement configured such that the extension component can be readily released, such as by way of a mechanical locking mechanism with a button, slider, or other conveniently actuated release component. Other couplers are also possible.

Figure 6:
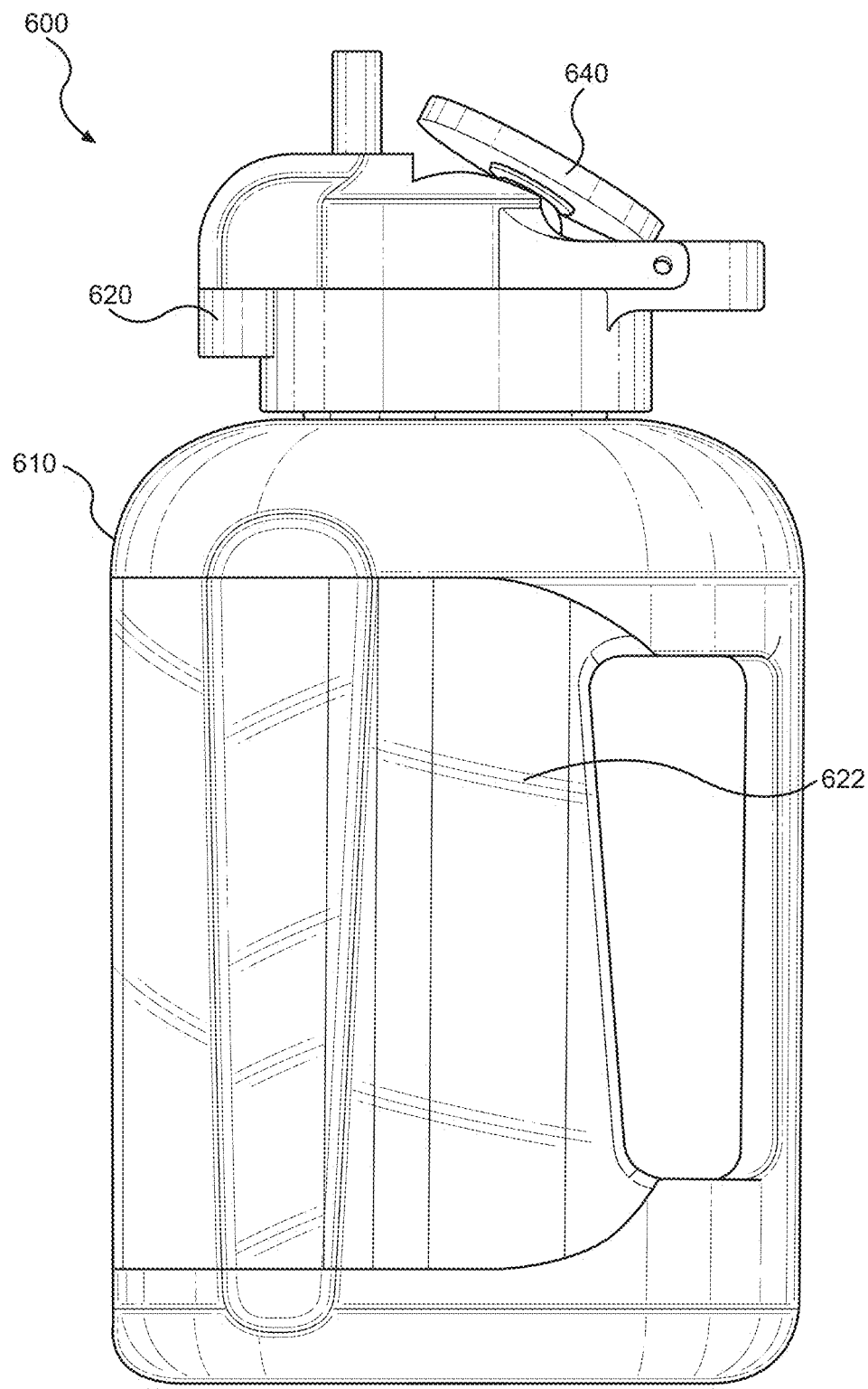
FIG. 6 illustrates in side elevation view an example alternative beverage container with an extension component in its lid according to one embodiment of the present disclosure.

FIG. 6 illustrates in side elevation view an example alternative beverage container with an extension component in its lid. Similar to various foregoing embodiments, beverage container 600 can include a container body 610, container lid 620, and media device coupling component 640. Container lid 620 can have a hollow shaft 622 coupled thereto or formed therewith that extends down into an inner volume of container body 610. This hollow shaft 622 can be configured to house an extension component (not shown) that can be configured to extend and retract to alter the vertical positioning of media device coupling component 640 above the overall beverage container 600. Beverage container 600 can be different in some ways from the foregoing embodiments, such as by having a hinged flip top component at its lid, for example, as well as a positioning of hollow shaft 622 that is offset from a center axis running through the top and bottom of the beverage container, among other possible differences. Other variations of beverage containers having extension components contained within a lid component are also possible, as will be readily appreciated.

Figure 7:
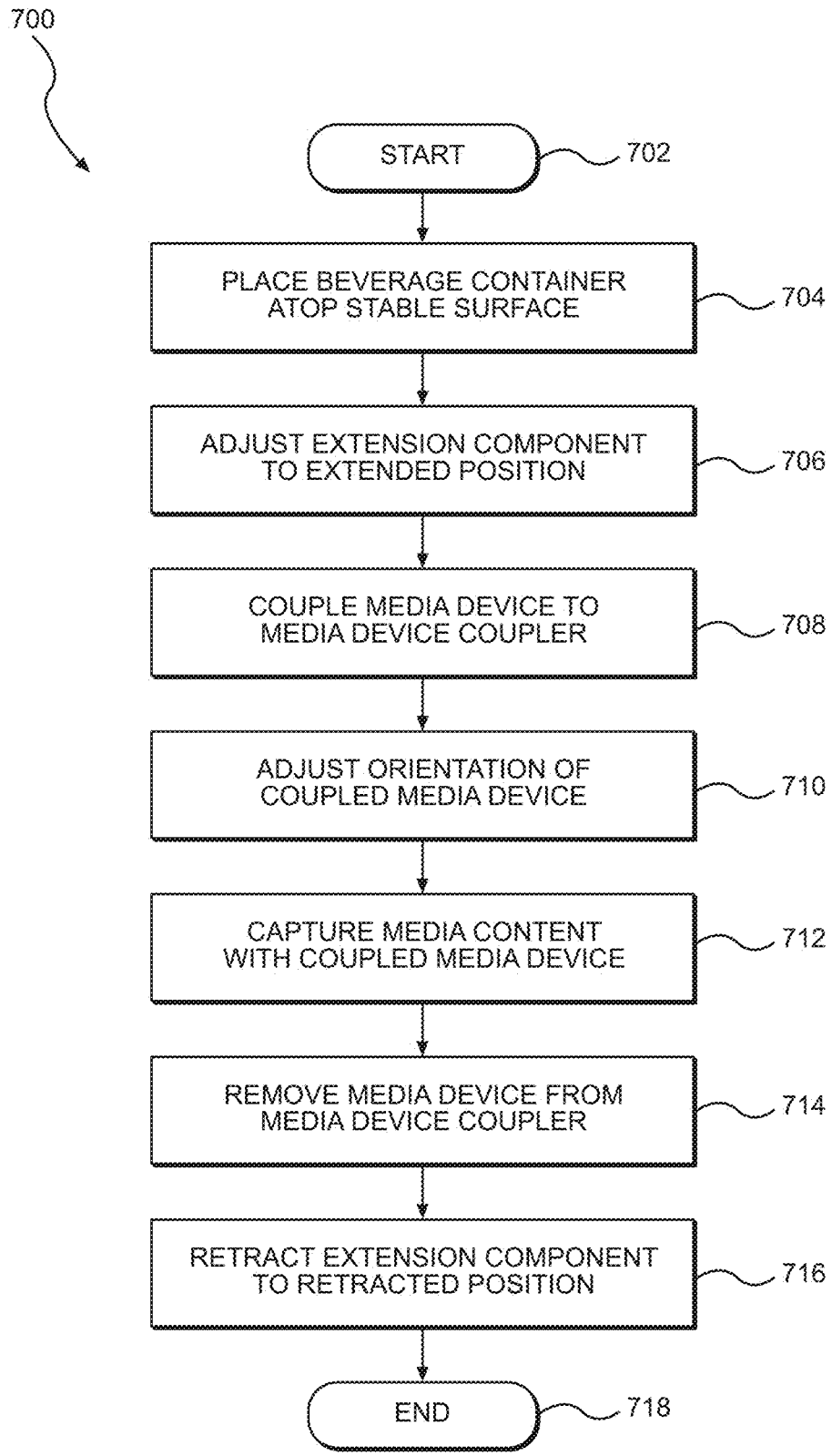
FIG. 7 illustrates a flowchart of an example detailed method of capturing media content using a beverage container according to one embodiment of the present disclosure.

Moving next to FIG. 7, a flowchart of an example detailed method of capturing media content using a beverage container is provided. Detailed method 700 can represent one possible way of capturing media content using a beverage container, and it will be understood that various other steps, features, and details of such a detailed method are not provided here for purposes of simplicity. Detailed method 700 can include some or all steps and details of summary method 400 above, as will be readily appreciated. While detailed method 700 contemplates capturing media content using a smartphone that is supported by a water bottle, it will be appreciated that this same method and logical variations thereof can be used for other media devices and other beverage or fluid containers, such as a digital camera supported by a jug, for example.

After a start step 702, a first process step 704 can involve placing the beverage container atop a stable surface, which can result in the beverage container being able to provide stable support for a separate media device to be coupled thereto without falling over. Such a stable surface can include the ground, floor, table, or chair, for example, among other possible stable surfaces. Step 704 can be performed automatically in some arrangements, such as where a separate automated components can be programmed to adjust the position and/or orientation of the beverage container to be at a more stable position atop the stable surface.

At the next process step 706, an extension component can be adjusted to an extended position. Step 706 can be identical or substantially similar to step 404 above. Again, the extension component can be a telescoping selfie stick or any other suitable device, and can be coupled to a beverage container, such as at a lid or container body of the beverage container. In some arrangements, adjustment can involve moving the extension component from a fully retracted position to a fully extended or any partially extended position. In other situations, adjustment can involve moving the extension component from one extended position to a different extended position. Step 706 can be performed automatically or partially automated in some arrangements, such as where one or more motors or automated items associated with the extension component can facilitate the adjustment.

At a following process step 708, a media device can be coupled to a media device coupler or coupling component. Step 708 can be identical or substantially similar to step 406 above. Again, the media device can be a smartphone or any other suitable media device. The media device coupling component can be a flat magnetic plate coupled to an extendable end of the extension component or any other suitable coupling component or arrangement. Coupling the media device to the media device coupling component can result in the beverage container then supporting the media device, similar to how a tripod can also support such a media device. Step 708 can be performed automatically or partially automated in some arrangements, such as where one or more motors or automated items associated media device coupling component can facilitate the coupling.

Subsequent process step 710 can involve adjusting an orientation of the coupled media device. This can involve, for example, tilting, rotating, and/or spinning the coupled media device such that it is at a desired height and location, such that it faces in a desired direction, and/or such that it is arranged at a desired angle. This can involve adjusting the media device coupling component about one or more rotational axes with respect to the extension component, whereupon the coupled media device follows the movements and rotations of the adjusted media device coupling component. Step 710 can be performed automatically or partially automated in some arrangements, such as where one or more motors or automated items associated with the media device coupling component and/or the extension component can facilitate the rotation and/or spin of these components to adjust orientation. As noted above, this can involve the use of one or more specific programs or apps that might be loaded onto the media device, and can also involve communication between the media device and any automated components on the beverage container, such as a ported wired connection, Bluetooth, WiFi, or any other suitable wireless connection.

At the next process step 712, media content can be captured with the coupled media device. Step 712 can be identical or substantially similar to step 408 above. Again, capturing media content can involve taking a video, picture, or any other media content using the now coupled and supported smartphone or other media device. Step 712 can be performed automatically or partially automated in some arrangements, such as where the media device is programmed to capture media content automatically based on various settings or inputs, which can also involve the use of one or more remote controls or other associated computing or processing devices. This can also involve the use of one or more specific programs or apps that might be loaded onto the media device, such as an app that can be configured to analyze camera visual input and capture content in a suitable manner.

A following process step 714 can involve removing the media device from the media device coupling component. This can involve simply pulling the smartphone or other media device off from the coupling component where only a magnetic attraction holds the media device in place. Where alternative or additional features couple the media device to media device coupling component, then such alternative clamp, frame, and/or other mechanical holding or locking elements can be actuated to release the coupling of the media device such that the media device can be removed, as will be readily appreciated. Step 714 can be performed automatically or partially automated in some arrangements, such as where a button or other input can result in one or more motors or automated items to facilitate a release of the media device.

The next process step 716 can involve retracting the extension component to its fully retracted position. This can result in the beverage container being as compact as possible such that it is more readily handled and transportable after media capture has been accomplished. Step 716 can be performed automatically or partially automated in some arrangements, such as where one or more motors or automated items associated with the extension component can facilitate its adjustment to a fully retracted position.

The method can then end at step 718. For foregoing detailed method 700, it will be appreciated that not all process steps are necessary, and that other process steps may be added in some arrangements. For example, step 704 might be unnecessary where an alternative way to stabilize the beverage container is possible besides placing it atop a stable surface. Steps can also be performed in different orders where practical. For example, step 708 can be performed before one or both of steps 704 and 706. Although known process steps are provided for the various techniques in detailed method 700, it will be appreciated that other similar methods for capturing media content using a beverage container are also possible.

As one possible example, expanded methods can also include the ability to use the disclosed beverage containers, expansion components, and media device coupling components in applications that involve more than just media capture with the separate media devices. This can involve, for example, smartphones or other computing devices that are configured to provide gym coaching or other instructional assistance for a user. In some arrangements, one or more programs or apps on a smartphone or other media device can integrate with a camera and/or microphone on the media device to accept live input, conduct processing thereupon, and provide output to a user in real time while the media device remains mounted to the disclosed system. For example, additional method steps can include autotracking, processing the captured media content and providing visual and/or audio output to a user regarding their form or movements while the media device remains coupled to the media device coupling component. Autotracking can involve, for example, a program or specific app loaded onto the media device being configured to facilitate tracking a user or other subject using camera visual input. This can then also result in the program or app communicating commands to an automated positioning and orienting system for one or more motors to automatically spin, tilt, pan, rotate, or otherwise manipulate the extension component and/or the media device coupling component based on tracking the subject to be recorded even when the subject moves or leaves the field of view. Other variations and extrapolations of the disclosed methods will be readily appreciated by those of skill in the art.

Lastly, FIGS. 8A through 10B provide various alternative embodiments of beverage containers having associated extension components. In such alternative arrangements, the extension component and coupled media device coupling component can be stored at, extend from, and retract to other locations besides a container lid, such as, for example, a container body or a separate housing component coupled to the container lid, container body, or both. While these alternative embodiments provide different ways of accomplishing the same objectives of the embodiments shown and described above with respect to providing an extension component for use with a beverage container, it will be readily appreciated that many other alternative embodiments and variations are also possible, such that the embodiments shown herein are examples and are not limiting.

Figure 8A:
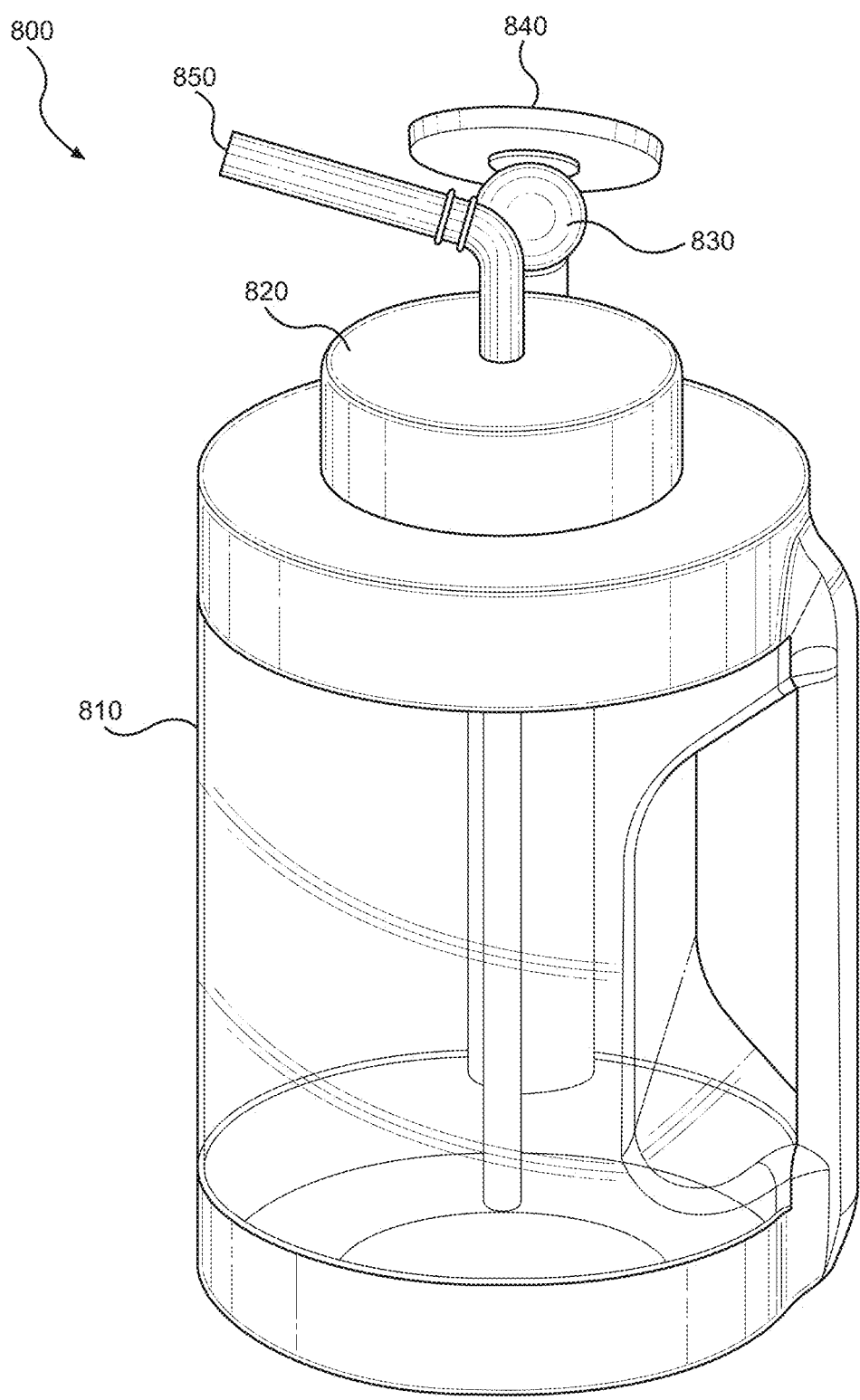
FIG. 8A illustrates in side perspective view an example beverage container with an extension component in the container according to one embodiment of the present disclosure.
Figure 8B:
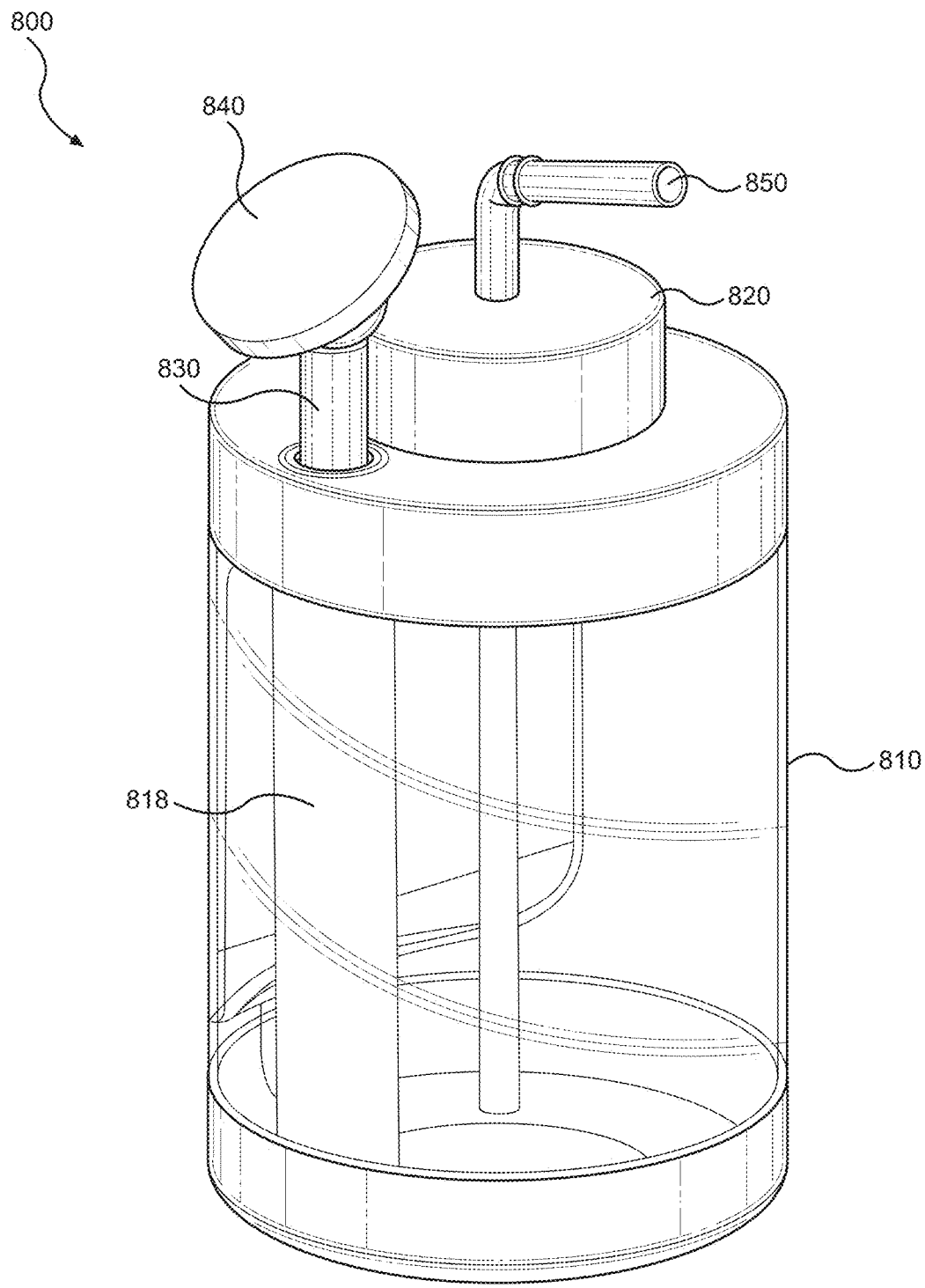
FIG. 8B illustrates in an alternate side perspective view the beverage container of FIG. 8A according to one embodiment of the present disclosure.
Figure 8C:
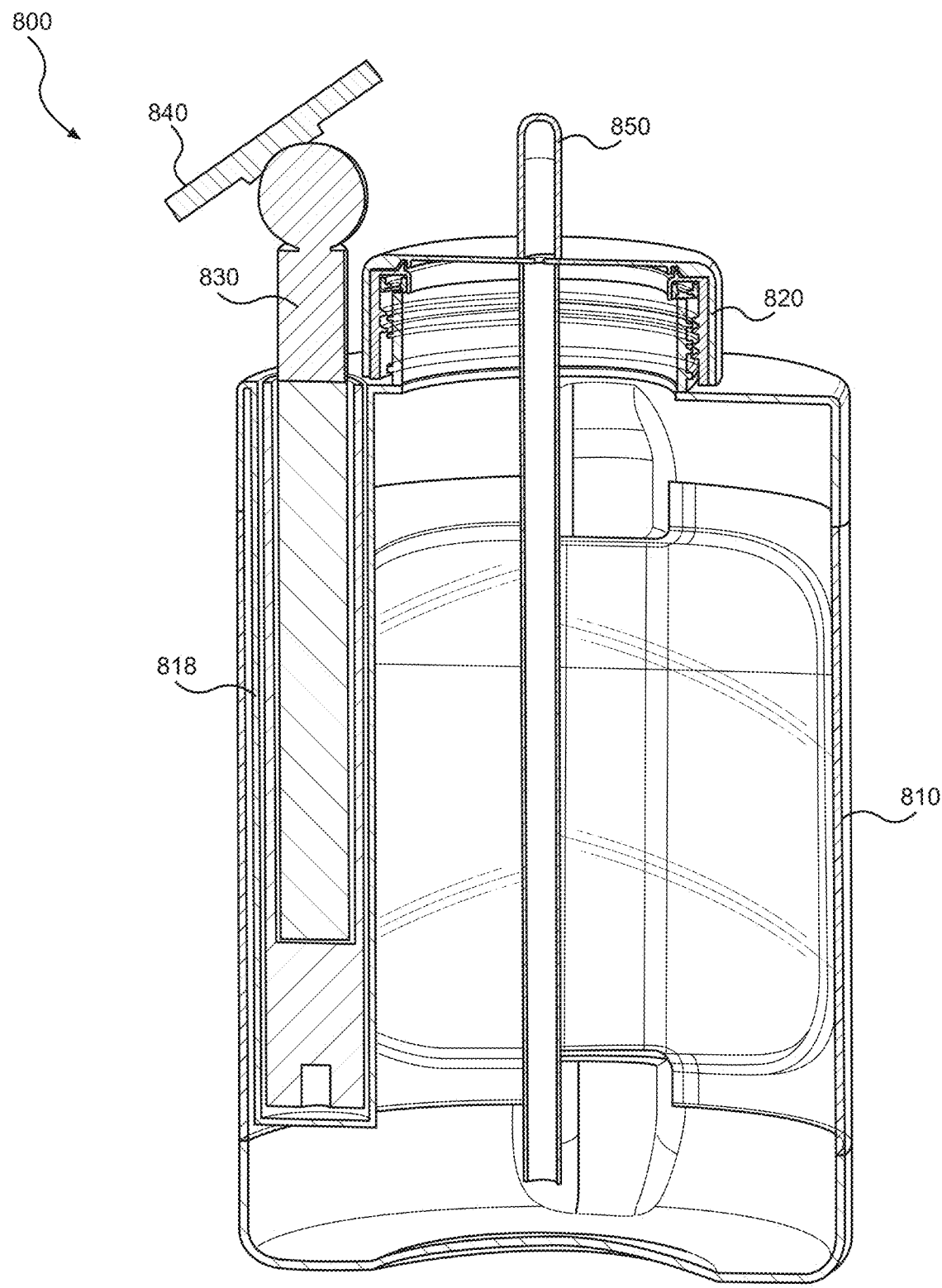
FIG. 8C illustrates in side cross-section view the beverage container of FIG. 8A according to one embodiment of the present disclosure.
Figure 8D:
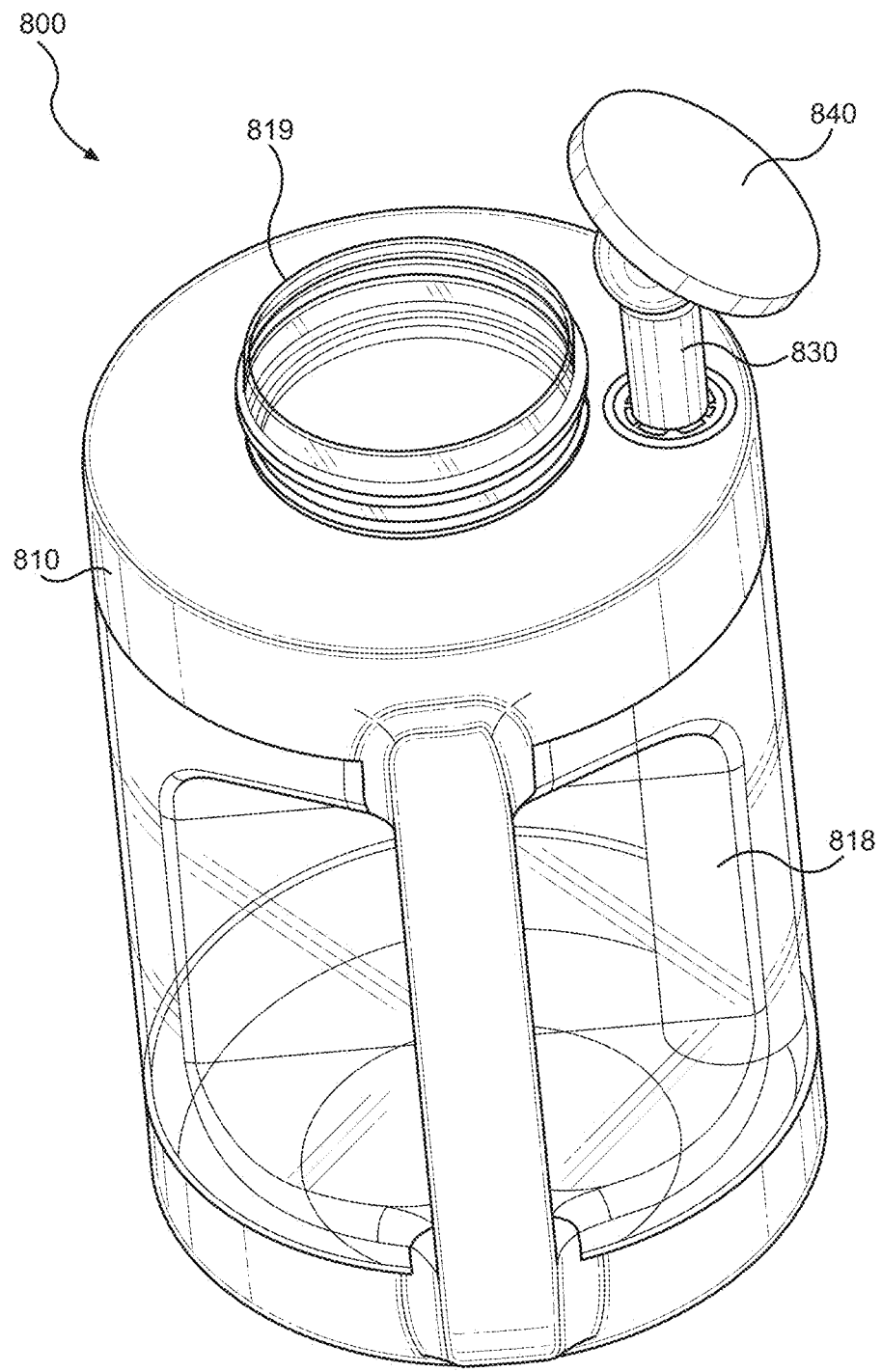
FIG. 8D illustrates in top perspective view the beverage container of FIG. 8A with its lid removed according to one embodiment of the present disclosure.

FIGS. 8A-8D illustrate an example beverage container with an extension component in the container in side perspective, alternate side perspective, side cross-section, and top perspective views respectively. Beverage container 800 can include components such as container body 810, container lid 820, extension component 830, media device coupling component 840, and straw 850, among other possible components and features. Unlike the foregoing embodiments where the extension component is housed within and extends from a component that is part of the lid, beverage container includes an extension housing 819 that is formed within container body 810. This can result in extension component 830 and media device coupling component 840 remaining with container body 810 when container lid 820 is removed therefrom, as shown in FIG. 8D. Other components, features, and functionalities of beverage container 800 can remain similar to foregoing beverage container embodiments.

As shown in FIG. 8D, container body 810 can include a wide mouth opening 819 at a top surface thereof that is configured to facilitate a removable coupling with a removable lid. Again, this can be accomplished by way of mating threaded arrangements in both the container body 810 and removable container lid 820. Such a threaded wide mouth opening can also be used for the container body in other embodiments, such as beverage container 100 above. In those arrangements where the removable lid includes the extension component and a housing therefor that extends downward from the lid, a wide mouth opening such as that which is shown here can be particularly useful to provide a large enough geometry to accommodate the hollow shaft or other housing component for the extension component that is then inserted into the inner volume of the container body when the lid is coupled thereto.

Figure 9:
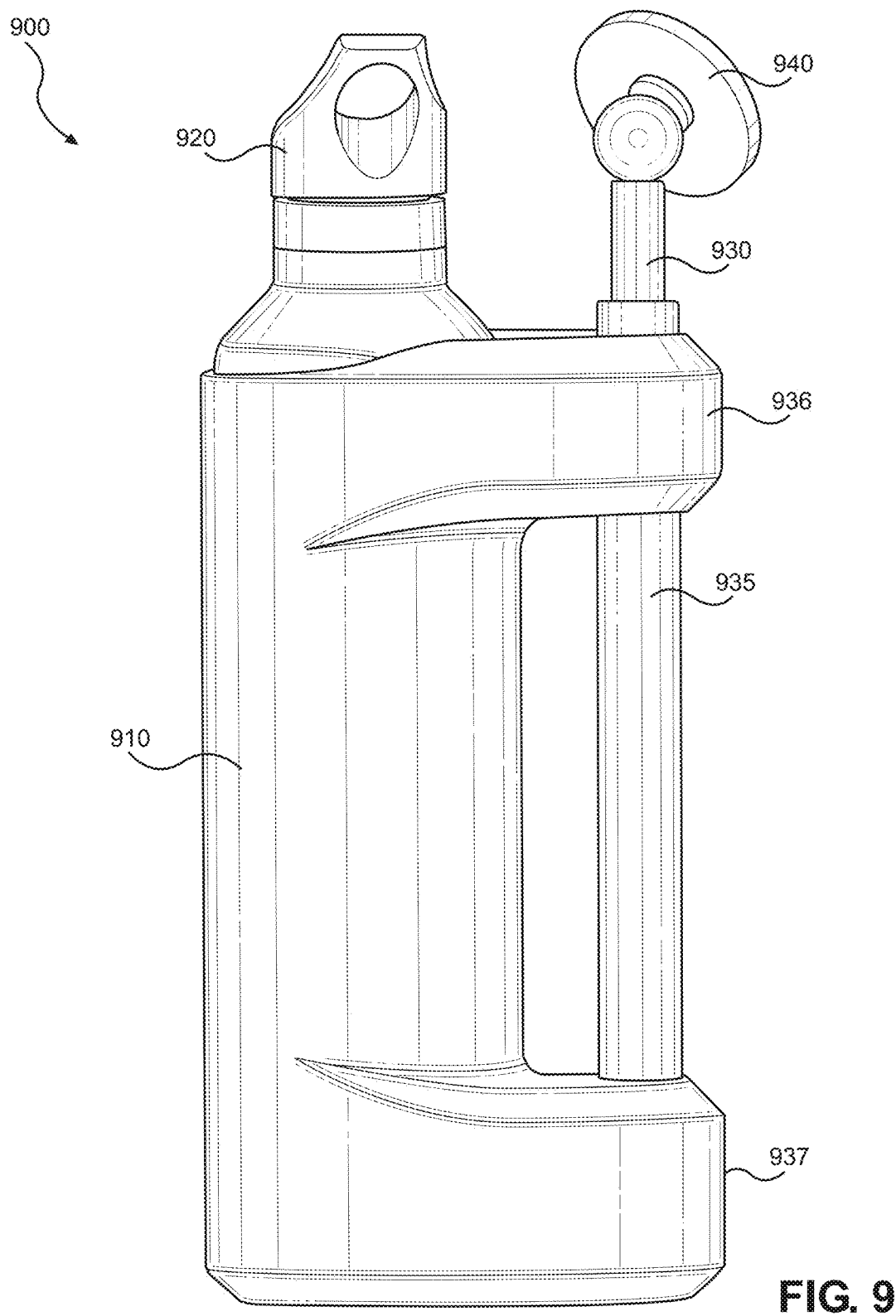
FIG. 9 illustrates in side elevation view an example beverage container with an extension component coupled thereto according to one embodiment of the present disclosure.

FIG. 9 illustrates in side elevation view an example beverage container with an extension component coupled thereto. Beverage container 900 can include components such as container body 910, container lid 920, extension component 930, and media device coupling component 940, among other possible components and features. Unlike the foregoing embodiments, extension component 930 is not a part of the container lid 920 and is not held within an inner volume of container body 910. Rather, extension component 930 can be contained within an extension housing 935, which in turn can be held in place by one or more protrusions 936 extending from container body 910. Such protrusions 936 can be integrally formed with container body 910 in some arrangements, and the combined geometry of these items can provide an enlarged and stable base at the bottom of beverage container 900. Other components, features, and functionalities of beverage container 800 can remain similar to foregoing beverage container embodiments.

Figure 10A:
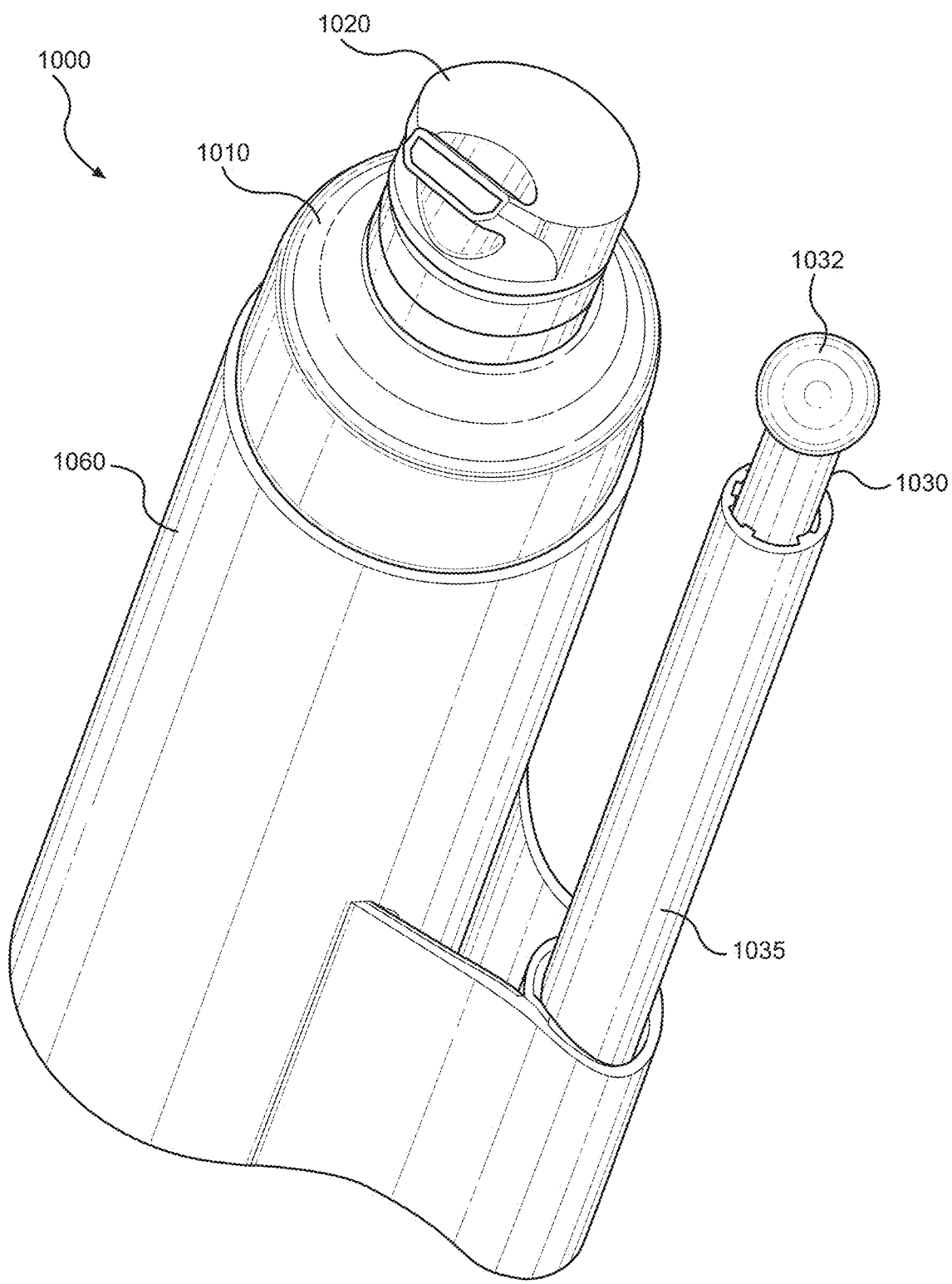
FIG. 10A illustrates in top perspective view an example beverage container system having an outer housing that couples a beverage container with an extension component according to one embodiment of the present disclosure.
Figure 10B:
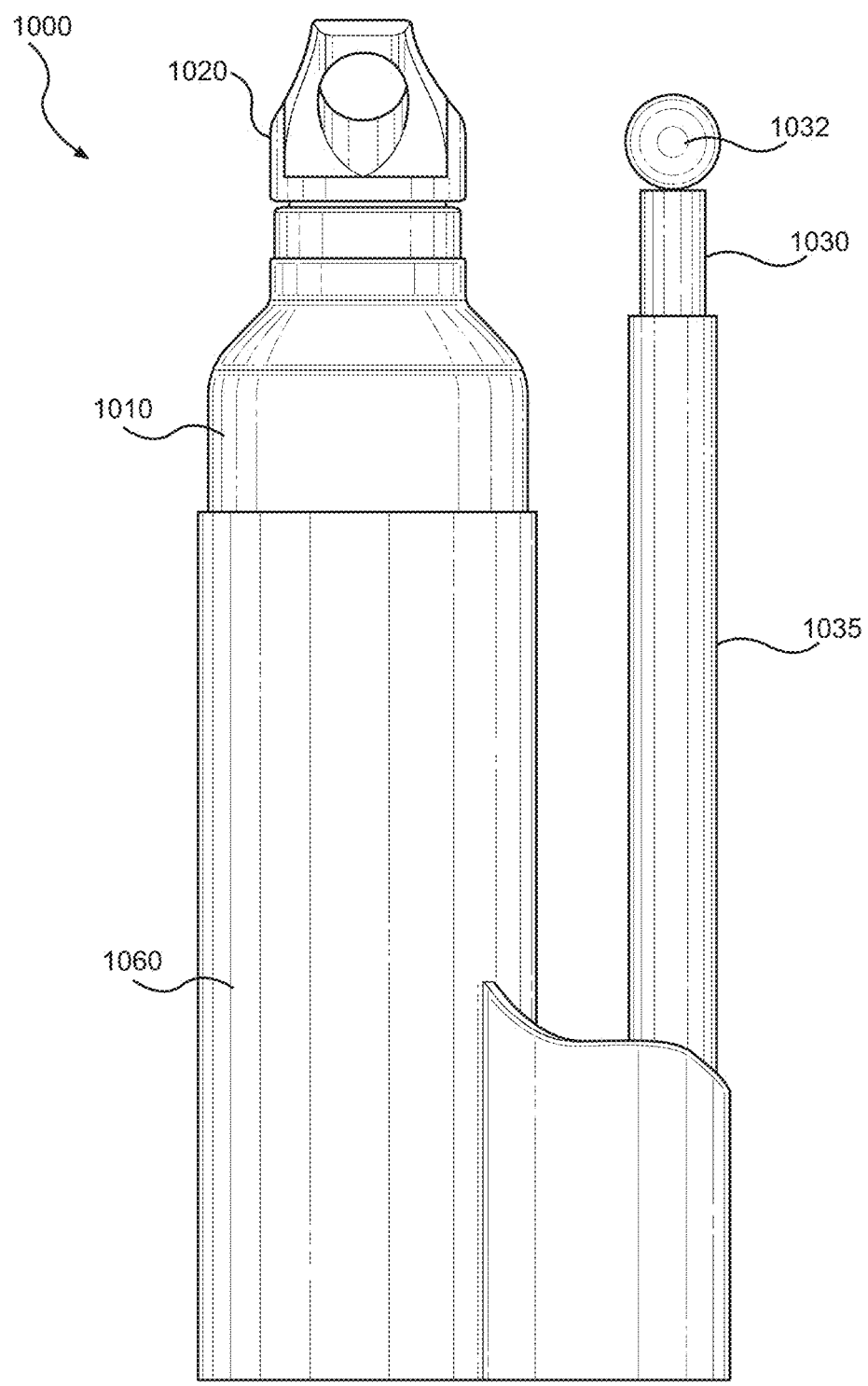
FIG. 10B illustrates in side elevation view the beverage container system of FIG. 10A according to one embodiment of the present disclosure.

Finally, FIGS. 10A-10B illustrate in top perspective and side elevation views an example beverage container system having an outer housing that couples a beverage container with an extension component. Beverage container 1000 can include components such as container body 1010, container lid 1020, and extension component 1030, among other possible components and features. A suitable media device coupling component (not shown) can be coupled to a top distal end 1032 of extension component 1030 in a manner that is identical or similar to that which is shown above for other embodiments. Extension component 1030 can be contained within an extension housing 1035 where it can extend from and retract back into the extension housing, similar to that which is shown for extension housing 935 above.

Beverage container 1000 can also include an outer housing 1060 to hold and couple together different items. In particular, outer housing 1060 can be configured to hold container body 1010 at a first location and extension component 1030 at a second location separate from the first location. As shown, outer housing 1060 can actually hold extension housing 1035 at the second location, which in turn holds the extension component 1030. This outer housing 1060 can essentially form a stable bottom frame formed from sheet metal, hard plastic, or any other suitable material, and can be configured to functionally couple extension component 1030 to container body 1010 and to provide increased upright stability for beverage container 1000. In some arrangements, one or both of container body 1010 and extension housing 1035 can be removably coupled to outer housing 1060 such that one or both of these items can be readily slid out from and inserted back into the outer housing. Other components, features, and functionalities of beverage container 1000 can remain similar to foregoing beverage container embodiments.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A beverage container, comprising:
   a container body having a bottom, one or more sidewalls, and upper opening, wherein the container body defines an internal volume configured to store a beverage therein;
   a lid removably coupled to the container body proximate the upper opening, wherein the lid is configured to hold the beverage within the internal volume while the lid is coupled to the container body;
   an extension component coupled to the container body or the lid and configured to move between extended and retracted positions, wherein the extension component includes a proximal end configured to remain stationary relative to the container body and a distal end opposite the proximal end and configured to be moved relative to the container body between the extended and retracted positions;
   a hollow shaft having an inner space that is configured to store the extension component therein, wherein the hollow shaft is coupled to and extends downward from a bottom surface of the lid; and
   a media device coupling component coupled to the distal end of the extension component, wherein the media device coupling component is configured to facilitate a removable coupling with a separate portable media device of a user.

2. The beverage container of claim 1, wherein the beverage container is a drink bottle and the portable media device is a smartphone.

3. The beverage container of claim 1, wherein the extension component is contained within the lid and is configured to be coupled to and removed from the container body with the lid.

4. The beverage container of claim 1, wherein the hollow shaft extends into the internal volume of the container body and is configured to prevent leakage between the internal volume of the container body and the inner space of the hollow shaft.

5. The beverage container of claim 1, wherein the hollow shaft includes a shaft opening configured to allow the extension component to extend outward from the hollow shaft and retract back into the hollow shaft.

6. The beverage container of claim 1, wherein the proximal end is configured to remain within the hollow shaft while the distal end extends outward from and retracts back to the shaft opening.

7. The beverage container of claim 1, wherein the extension component includes a plurality of telescoping segments configured to serially extend to reach the extended position and to nest within each other to reach the retracted position.

8. The beverage container of claim 1, wherein the media device coupling component is coupled to the distal end in a manner that provides one or more rotational degrees of freedom between the media device coupling component and the extension component to facilitate positioning and orienting the separate portable media device.

9. The beverage container of claim 8, further comprising:
   one or more motors configured to rotate automatically the media device coupling component about the one or more rotational degrees of freedom.

10. The beverage container of claim 1, wherein the media device coupling component includes a flat plate and a magnetic arrangement configured to magnetically hold the separate portable media device against the flat plate.

11. The beverage container of claim 1, further comprising:
    a weighted arrangement located proximate the bottom of the container body, wherein the weighted arrangement is configured to improve stability of the beverage container while the separate portable media device is coupled to the media device coupling component and the extension component is at its extended position.

12. The beverage container of claim 1, further comprising:
    an outer housing configured to hold the container body at a first location and the extension component at a second location separate from the first location, wherein the outer housing is configured to functionally couple the extension component to the container body and to provide increased upright stability for the beverage container.

13. The beverage container of claim 1, wherein the hollow shaft extends through a central region of the container body internal volume.

14. The beverage container of claim 1, wherein the hollow shaft is integrally formed with the lid as a single unit.

15. A container lid configured for use with a separate beverage container, the container lid comprising:
   a top portion configured to be removably coupled to a separate beverage container having a bottom, one or more sidewalls, an upper opening, and an internal volume configured to store a beverage therein, wherein the top portion is further configured to hold a beverage within the internal volume while the top portion is coupled thereto;
   an extension component coupled to the top portion and configured to move between extended and retracted positions, wherein the extension component includes a proximal end configured to remain stationary relative to the top portion and a distal end opposite the proximal end and configured to be moved relative to the top portion between the extended and retracted positions;
   a hollow shaft coupled to and extending downward from a bottom surface of the top portion, with the hollow shaft having an inner space that is configured to store the extension component therein, wherein the hollow shaft is configured to extend into the internal volume of the separate beverage container and is configured to prevent leakage between the internal volume of the separate beverage container and the inner space of the hollow shaft; and
   a media device coupling component coupled to the distal end of the extension component, wherein the media device coupling component is configured to facilitate a removable coupling with a separate portable media device of a user.

16. The container lid of claim 15, wherein the hollow shaft includes a shaft opening at a top portion thereof, the shaft opening being located at a top surface of the top portion of the lid, and wherein the shaft opening is configured to allow the extension component to extend outward from the hollow shaft and retract back into the hollow shaft.

17. The container lid of claim 16, wherein the proximal end is configured to remain within the hollow shaft while the distal end extends outward from and retracts back to the shaft opening, and wherein the extension component includes a plurality of telescoping segments configured to serially extend to reach the extended position and to nest within each other to reach the retracted position.

18. The container lid of claim 15, wherein the media device coupling component is coupled to the distal end in a manner that provides one or more rotational degrees of freedom between the media device coupling component and the extension component to facilitate positioning and orienting the separate portable media device, and wherein the media device coupling component includes a flat plate and a magnetic arrangement configured to magnetically hold the separate portable media device against the flat plate.

19. A method of capturing media content using a beverage container, the method comprising:
   adjusting an extension component at the beverage container from a retracted position to an extended position, the beverage container including a hollow shaft extending downward from a bottom surface of a lid and having an inner space that stores the extension component therein when the extension component is at the retracted position, wherein the extension component includes a proximal end that remains stationary relative to the beverage container and a distal end that moves away from the beverage container from the retracted position to the extended position;
   coupling a media device to a media device coupling component located at the distal end of the extension component, wherein the coupling results in the beverage container, extension component, and media device coupling component collectively holding the media device stably in place at a set position; and
   capturing media content with the media device while the media device remains coupled to the media device coupling component.

20. The method of claim 19, further comprising the steps of:
   placing the beverage container upright atop a stable surface;
   removing the media device from the media device coupling component after capturing the media content; and
   retracting the extension component from the extended position to the retracted position after removing the media device, wherein the extended position results in the media device coupling component being located at least two feet away from the beverage container and the retracted position results in the media device coupling component being located substantially at the beverage container.

* * * * *